(12) United States Patent
Zheng et al.

(10) Patent No.: US 7,889,713 B2
(45) Date of Patent: Feb. 15, 2011

(54) TRANSMISSION OF MANAGEMENT MESSAGES FOR RELAY NETWORKS

(75) Inventors: Haihong Zheng, Coppell, TX (US); Shashikant Maheshwari, Irving, TX (US); Yousuf Saifullah, Richardson, TX (US)

(73) Assignee: Nokia Corporation, Espoo (FI)

( * ) Notice: Subject to any disclaimer, the term of this patent is extended or adjusted under 35 U.S.C. 154(b) by 320 days.

(21) Appl. No.: 11/549,387

(22) Filed: Oct. 13, 2006

(65) Prior Publication Data

US 2008/0002610 A1    Jan. 3, 2008

Related U.S. Application Data

(63) Continuation-in-part of application No. 11/480,767, filed on Jul. 3, 2006.

(51) Int. Cl.
| | |
|---|---|
| H04L 12/28 | (2006.01) |
| H04L 12/56 | (2006.01) |
| H04W 4/00 | (2009.01) |
| H04W 40/00 | (2009.01) |
| H04B 7/15 | (2006.01) |

(52) U.S. Cl. .................. 370/351; 370/328; 370/389; 370/395.2; 370/395.3; 455/11.1; 455/445

(58) Field of Classification Search .................. 370/328, 370/357, 389, 395.2, 395.3; 455/445, 11.2, 455/41.2, 41.3

See application file for complete search history.

(56) References Cited

U.S. PATENT DOCUMENTS

| | | | |
|---|---|---|---|
| 7,646,752 | B1 | 1/2010 | Periyalwar et al. |
| 2002/0080736 | A1 | 6/2002 | Furukawa |
| 2002/0191573 | A1 | 12/2002 | Whitehill et al. |
| 2003/0091014 | A1 | 5/2003 | Meier |
| 2004/0025018 | A1* | 2/2004 | Haas et al. .................. 713/168 |
| 2004/0109493 | A1 | 6/2004 | Blessent et al. |
| 2004/0170147 | A1 | 9/2004 | Take |
| 2005/0058151 | A1 | 3/2005 | Yeh |

(Continued)

FOREIGN PATENT DOCUMENTS

EP    1524800 A2    4/2005

(Continued)

OTHER PUBLICATIONS

Johnson, David B, Dynamic Source Routing in Ad Hoc Wireless Networks, Carnegie Mellon University, 1995.*

(Continued)

*Primary Examiner*—Dwayne D Bost
*Assistant Examiner*—Larry Sternbane
(74) *Attorney, Agent, or Firm*—Brake Hughes Bellermann LLP

(57) ABSTRACT

Various example embodiments are disclosed relating to sending and processing messages in relay networks. In an example embodiment, a first unicast message indicating a plurality of wireless nodes included in a communication path between a base station and a path endpoint node in a wireless network may be received at a first receiving node, wherein the first unicast message may be received from a sending wireless node located neighboring to the first receiving node in the communication path. The first unicast message may be processed at the first receiving node. A second message may be sent based on a success/failure status of the processing from the first receiving node to a second receiving node included in the communication path.

15 Claims, 17 Drawing Sheets

U.S. PATENT DOCUMENTS

| | | | |
|---|---|---|---|
| 2005/0117539 | A1 | 6/2005 | Song et al. |
| 2005/0232183 | A1 | 10/2005 | Sartori et al. |
| 2005/0286547 | A1 | 12/2005 | Baum et al. |
| 2006/0107166 | A1* | 5/2006 | Nanda .................. 714/748 |
| 2006/0176973 | A1 | 8/2006 | Alamouti et al. |
| 2007/0097945 | A1 | 5/2007 | Wang et al. |
| 2007/0110016 | A1* | 5/2007 | Shen et al. .................. 370/338 |
| 2008/0039014 | A1 | 2/2008 | Tsai et al. |
| 2008/0056193 | A1 | 3/2008 | Bourlas et al. |
| 2008/0117854 | A1 | 5/2008 | Saifullah et al. |
| 2008/0291847 | A1 | 11/2008 | Zheng |

FOREIGN PATENT DOCUMENTS

| | | |
|---|---|---|
| EP | 1912390 A1 | 10/2006 |
| WO | 200055640 A1 | 9/2000 |
| WO | 2006096728 A2 | 9/2006 |
| WO | 2008/004062 A8 | 1/2008 |
| WO | 2008004062 A3 | 1/2008 |
| WO | 2008004066 A3 | 1/2008 |
| WO | 2008047203 A2 | 4/2008 |
| WO | 2008047203 A3 | 4/2008 |

OTHER PUBLICATIONS

Pabst, Ralf, Relay-Based Deployment Concepts for Wireless and Mobile Broadband Radio, IEEE Communications Magazine, Sep. 2004, pp. 80-88.*

IEEE Standard 802.16-2004 (Oct. 1, 2004).*

IEE Standard 802.16-2004 (Oct. 1, 2004).*

Wiemann, H et al., "A Novel Multi-Hop ARQ Concept", Vehicular Technology Conference, VTC 2005-Spring. 2005 IEEE 6st,(Jun. 2005),3097-3101.

Marks, R et al., "IEEE Standard 802.16: A Technical Overview of the WirelessMAN Air Interface for Broadband Wireless Access", Retrieved from: www.ieee802.org/16/docs/02/C80216-02_05.pdf,(Jun. 4, 2002),98/107.

Saifullah, Y. et al., "Resource Request for Bandwidth", IEEE 802.16 Presentation Submission Template (Rev 8.3), (Nov. 15, 2006),16j-06/189 pp. 8.

Saifullah, Y. et al., "Resource Request for Bandwidth", IEEE 802.16 Broadband Wireless Access Working Group, (Jan. 18, 2007),16j-07/039r3 pp. 9.

Saifullah, Y. et al., "Clarification on CDMA Codes TLV", IEEE 802.16 Broadband Wireless Access Working Group, (Jul. 13, 2007),16j-07/402r3 pp. 3.

"6.3.2.3.5 Ranging Request (RNG-REQ) message", IEEE, Air Interface for Fixed Broadband Wireless Access Systems, IEEE Std 802.16-2004, 2004, p. 49.

Office Action for Israeli Application Serial No. 195928, mailed Feb. 24, 2010 (english translation), 2 pages.

Part 16: Air Interface for Fixed and Mobile Broadband Wireless Access Systems—Multihop Relay Specification, Baseline Document for Draft Standard for Local and Metropolitan Area Networks, P802.16j Baseline Document, 802.16j-06/026r4, Jun. 6, 2007, 203 pages.

Non-Final Office Action for U.S. Appl. No. 11/480,767, mailed Aug. 18, 2010, 18 pages.

Office Action for Russian Patent Application No. 2009117689 (including English Translation), mailed on Aug. 13, 2010, 12 pages.

Non-Final Office Action for U.S. Appl. No. 11/871,649, mailed on Oct. 19, 2010, 24 pages.

* cited by examiner

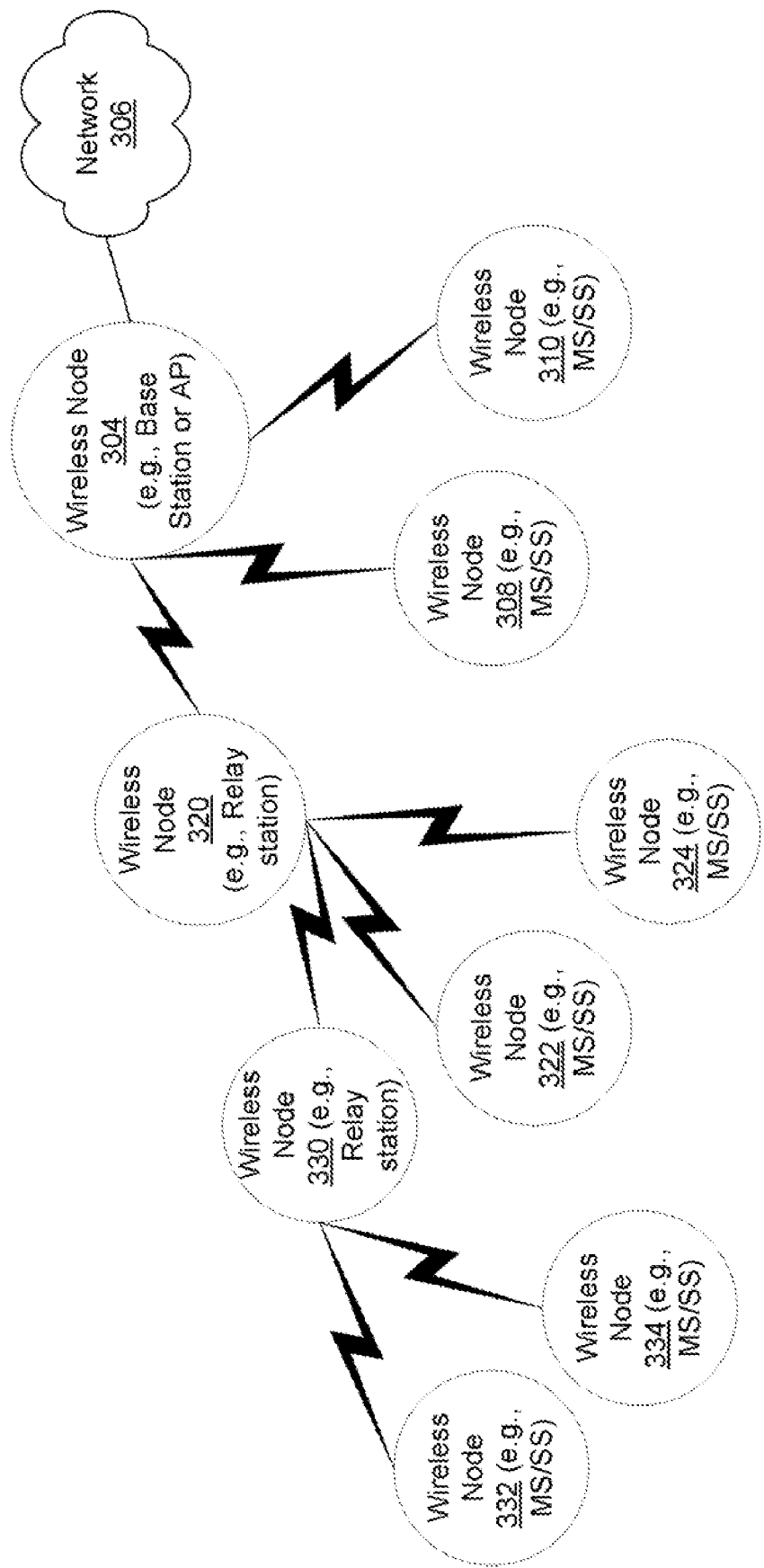

TRANSMISSION OF MANAGEMENT MESSAGES FOR RELAY NETWORKS

CROSS-REFERENCE TO RELATED APPLICATION

This application is a continuation-in-part of U.S. application Ser. No. 11/480,767, filed on Jul. 3, 2006, entitled "Topology and Route Discovery and Management for Relay Networks," hereby incorporated by reference.

BACKGROUND

The rapid diffusion of Wireless Local Area Network (WLAN) access and the increasing demand for WLAN coverage is driving the installation of a very large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. Other wireless technologies are being developed, such as IEEE 802.16 or WiMAX technology. A number of different 802.11 task groups are involved in developing specifications relating to improvements to the existing 802.11 technology. For example, a draft specification from the IEEE 802.11e Task Group has proposed a set of QoS parameters to be used for traffic between an Access Point and a station. See, e.g., Tim Godfrey, "Inside 802.11e: Making QoS A Reality Over WLAN Connections," CommsDesign, Dec. 19, 2003. Similarly in Ultra Wideband (UWB) environment, the WiMedia Alliance has published a draft standard, "Distributed Medium Access Control (MAC) for Wireless Networks," Release 1.0, Dec. 8, 2005.

As another example, a wireless relay network may include a multi-hop system in which end nodes such as mobile stations or subscriber stations (MS/SSs) may be coupled to a base station (BS) or Access Point (AP) via one or more relay stations (RSs). Thus, traffic between MS/SSs and the BS/AP may pass and be processed by the relay stations. The 802.16 Mobile Multi-hop Relay (MMR), referenced in IEEE 802.16 WG, is an example of a set of specifications relating to the relay concept. The MMR specifications include a focus on defining a network system that uses relay stations (RSs) to extend network coverage and/or enhance system throughput. These are a few examples of wireless network specifications, and there are many other technologies and standards being developed.

In a wireless network system without relay stations, a MS/SS may attach to a base station (BS) directly, and therefore, the BS may be aware of the route (i.e., only the one-hop route) to each of the attached MS/SS. However, when a relay station (RS) is introduced between a MS/SS and a BS, the BS may not be able to easily determine a routing path, or communication path between the MS/SS and BS. However, in scenarios such as, for example, centralized scheduling wherein a BS may schedule the resources for traffic transmissions over every segment on a communication path between a MS/SS and the BS, it may be desirable for the BS to be able to obtain or determine information regarding a complete communication path between the MS/SS and the BS. Moreover, it may be desirable for such an obtained or determined communication path to be easily managed and/or updated. Furthermore, it may be desirable to easily determine whether management messages are successfully received and processed by each relay station in a group of relay stations.

SUMMARY

Various embodiments are disclosed relating to wireless networks, and also relating to topology and route discovery and management in a relay network.

According to an embodiment, a method may include receiving a first message at a first network station in a wireless network. According to an example embodiment, the first message may, for example, include a ranging request message. The method may further include determining whether the received first message includes an identifier of a second network station indicating an attachment of a network node to the second network station. The method may further include modifying the received first message to include an identifier of the first network station indicating an attachment of the network node to the first network station if it is determined that the received message does not include the identifier of the second network station. According to an example embodiment, the received first message may be modified, for example, to include a type/length/value (TLV) field that includes the identifier of the first network station indicating the attachment of the network node to the first network station if it is determined that the received first message does not include an identifier of a second network station. The received first message may be forwarded to a third network station.

According to another embodiment, a method may include receiving a first message at a first network station in a wireless network. According to an example embodiment, the first message may include a ranging request message. The method may further include determining whether the received first message indicates that a network node is attaching to the first network station. The received first message may be forwarded to a second network station. Further, a second message may be sent to the second network station, the second message including an indication that the network node is directly attached to the first network station if it is determined that the received first message indicates that the network node is attaching to the first network station. According to an example embodiment, the second message may include a topology update request message. According to an example embodiment, one or more relay stations may receive the second message and determine the topology and/or a communication path between the base station and the network node that includes the network node based on the second message.

According to another embodiment, a method may include determining that a network node is detaching from a first network station in a wireless network. The method may further include sending a request to a second network station, the request including an indication that the network node is detaching from the first network station.

According to an example embodiment, the request may include a topology update request message. According to an example embodiment, a base station may receive the request and determine a network topology based on the request.

According to another embodiment, a method may include generating a message, at a first network station in a wireless network, the message including one or more identifiers of one or more other network stations indicating that the first network station is attaching to the one or more other network stations. The method may further include sending the message to the one or more other network stations.

According to an example embodiment, the message may include a ranging request message. According to an example embodiment, a base station may receive the message and determine a network topology based on the message.

According to another embodiment, a method may include updating path information associated with a current communication path to indicate an updated communication path between a base station and a network node in a wireless network. The method may further include sending a message indicating the updated communication path to each network node included in one or more of the current communication path or the updated communication path.

According to an example embodiment, each one of the network nodes that receives the message may update local data associated with network communication paths in a storage device associated with the each one of the network nodes based on the received message. According to an example embodiment, the sending the message may include determining a multicast group including each network node included in one or more of the current communication path or the updated communication path, determining a multicast address associated with the multicast group, and sending the message based on the multicast address.

According to another embodiment, a method may include determining that a network node in a wireless network is requesting a connection to a network station included in a first communication path between the network node and a base station. The method may further include determining one or more other communication paths between the network node and the base station. The method may further include selecting one or more selected paths from the first communication path and the one or more other communication paths based on network parameters. According to an example embodiment, the selecting may include selecting one or more selected paths from the first communication path and the one or more other communication paths based on network parameters, wherein the one or more selected paths include an uplink path and a downlink path. The method may further include sending a message indicating one of the selected communication paths to each network station that is included in the one of the selected communication paths.

According to an example embodiment, the sending of the message may include determining a multicast group including each network node included in the one of the selected communication paths, determining a multicast address associated with the multicast group, and sending the message based on the multicast address.

According to yet another example embodiment, a first unicast message indicating a plurality of wireless nodes included in a communication path between a base station and a path endpoint node in a wireless network may be received at a first receiving node, wherein the first unicast message may be received from a sending wireless node located neighboring to the first receiving node in the communication path. The first unicast message may be processed at the first receiving node. A second message may be sent based on a success/failure status of the processing from the first receiving node to a second receiving node included in the communication path.

According to an example embodiment, a management message including an indication of a plurality of wireless nodes included in a communication path between a base station and a path endpoint node in a wireless network may be generated at the base station. The management message may be sent via a unicast transmission to a first receiving node located at a downlink position neighboring to the base station in the communication path. It may be determined whether the management message is successfully processed by one or more of the wireless nodes included in the communication path based on the response message.

According to another example embodiment, an apparatus for wireless communications may be provided. The apparatus may include a controller, a memory coupled to the controller, and a wireless transceiver coupled to the controller. The apparatus may be adapted to receive a first unicast message indicating a plurality of wireless nodes included in a communication path between a base station and a path endpoint node in a wireless network, wherein the first unicast message is received from a sending wireless node located neighboring to the apparatus in the communication path, process the first unicast message, and send a second message based on a success/failure status of the processing to a second receiving node included in the communication path.

According to another example embodiment, an apparatus for wireless communications may be provided. The apparatus may include a controller, a memory coupled to the controller, and a wireless transceiver coupled to the controller. The apparatus may be adapted to generate a management message including an indication of a plurality of wireless nodes included in a communication path between the apparatus and a path endpoint node in a wireless network, send the management message via a unicast transmission to a first receiving node located at a downlink position neighboring to the apparatus in the communication path, receive a response message in response to the management message, and determine whether the management message is successfully processed by one or more of the wireless nodes included in the communication path based on the response message.

The details of one or more implementations are set forth in the accompanying drawings and the description below. Other features will be apparent from the description and drawings, and from the claims.

BRIEF DESCRIPTION OF THE DRAWINGS

FIG. 3b is a diagram of a multi-hop environment according to an example embodiment.

DETAILED DESCRIPTION

Figure 1:
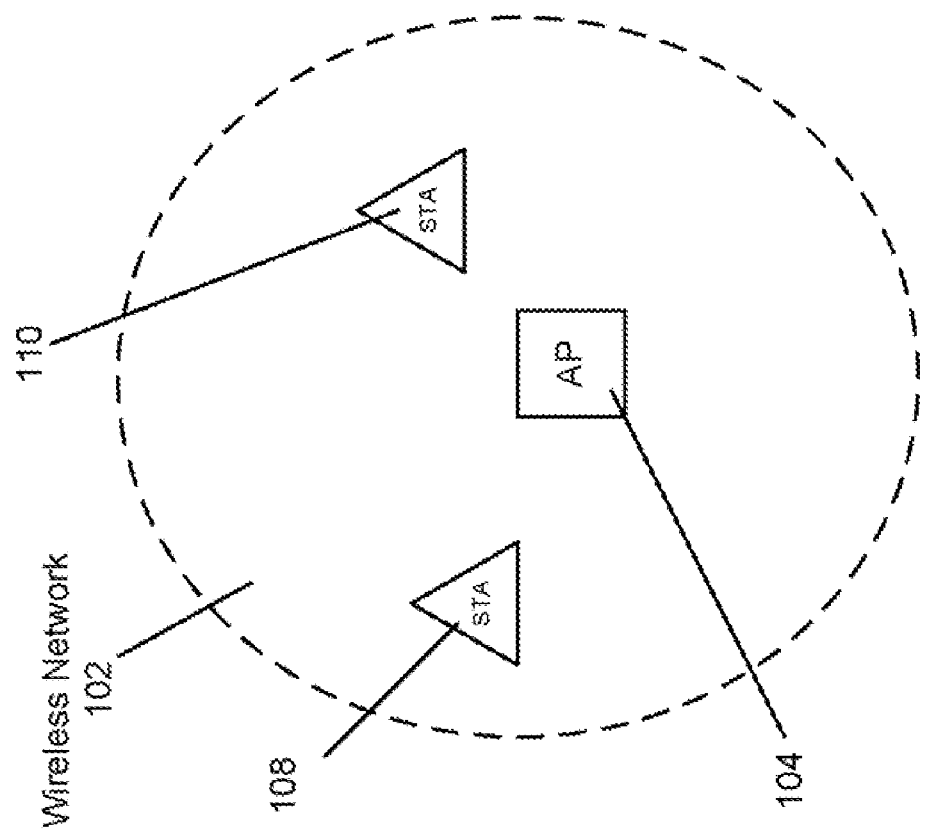
FIG. 1 is a block diagram illustrating a wireless network according to an example embodiment.

Referring to the Figures in which like numerals indicate like elements, FIG. 1 is a block diagram illustrating a wireless network 102 according to an example embodiment. Wireless network 102 may include a number of wireless nodes or stations, such as an access point (AP) 104 or base station and one or more mobile stations or subscriber stations, such as stations 108 and 110. While only one AP and two mobile stations are shown in wireless network 102, any number of APs and stations may be provided. Each station in network 102 (e.g., stations 108, 110) may be in wireless communication with the AP 104, and may even be in direct communication with each other. Although not shown, AP 104 may be coupled to a fixed network, such as a Local Area Network (LAN), Wide Area Network (WAN), the Internet, etc., and may also be coupled to other wireless networks.

Figure 2:
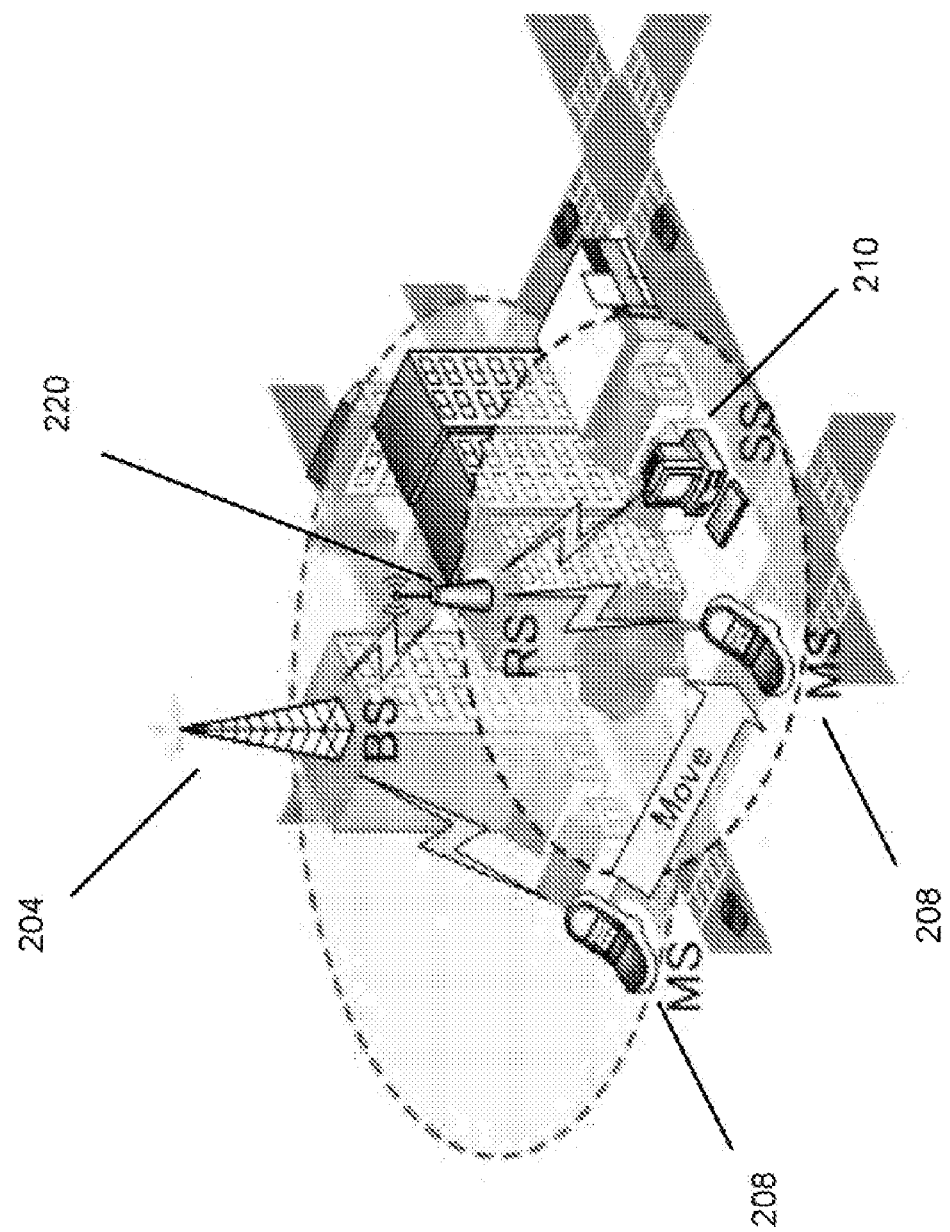
FIG. 2 is a block diagram illustrating a wireless network according to an example embodiment.

FIG. 2 is a block diagram illustrating a wireless network according to an example embodiment. According to an example embodiment, a mobile station MS 208 may initially communicate directly with a base station BS 204, for example, and a subscriber station 210 may communicate with the base station BS 204 via a relay station RS 220. In an example embodiment, the mobile station 208 may travel or move with respect to base station BS 204. For example, the mobile station MS 208 may move out of range of the base station BS 204, and may thus begin communicating with the base station 204 via the relay station 220 as shown in FIG. 2.

Figure 3A:
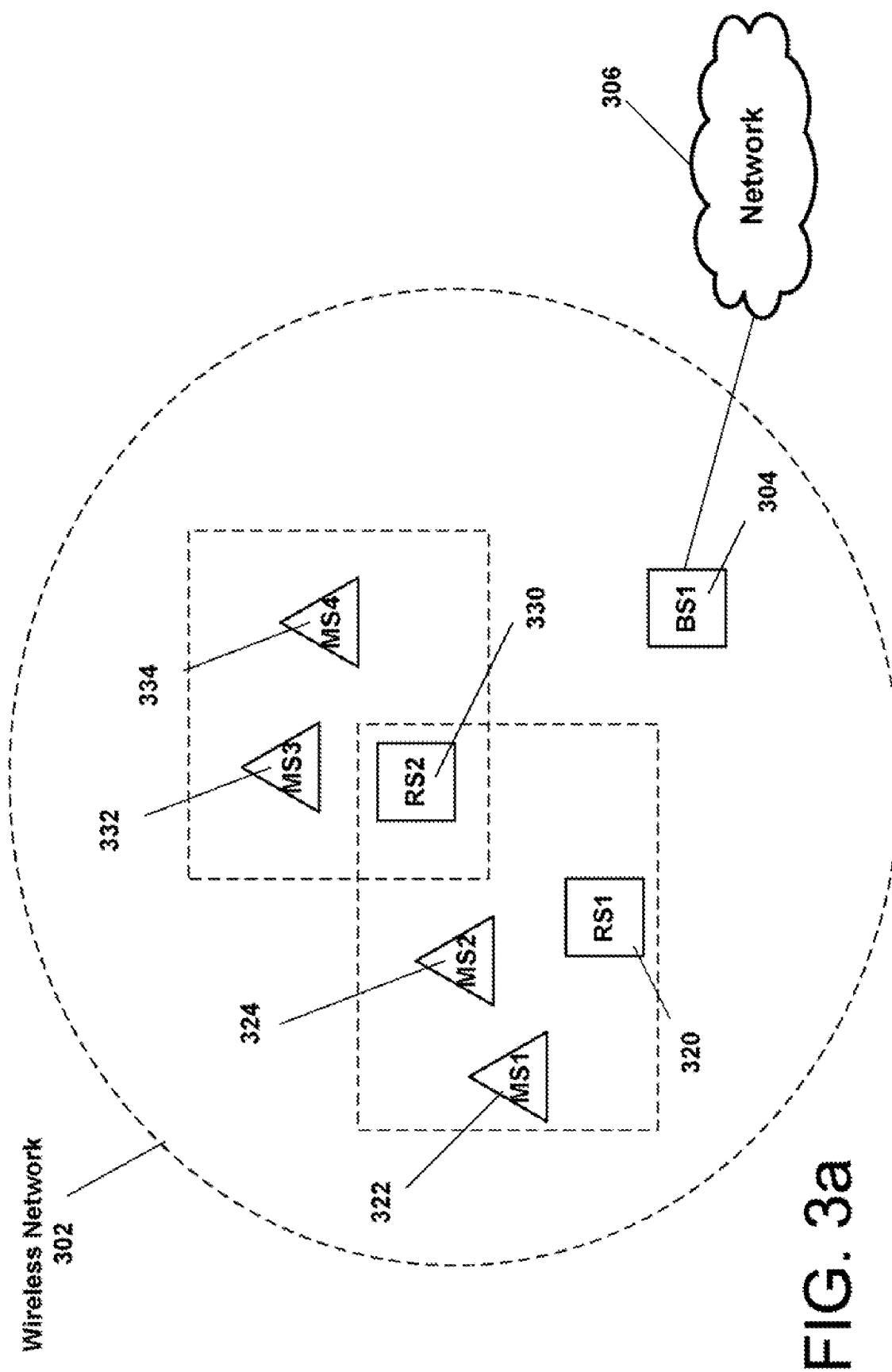
FIG. 3a is a block diagram illustrating a wireless relay network according to an example embodiment.

FIG. 3a is a block diagram illustrating a wireless network 302 according to an example embodiment. Wireless network 302 may include a number of wireless nodes or stations, such as base station BS1 304, relay stations RS1 320 and RS2 330, a group of mobile stations, such as MS1 322 and MS2 324 communicating with relay station RS1 320, and MS3 332 and MS4 334 communicating with relay station RS2 330. As shown, relay station RS2 330 also communicates with relay station RS1 320. While only one base station, two relay stations, and four mobile stations are shown in wireless network 302, any number of base stations, relay stations, and mobile stations may be provided. The base station 304 may be coupled to a fixed network 306, such as a Wide Area Network (WAN), the Internet, etc., and may also be coupled to other wireless networks. The group of stations MS1 322, MS2 324, and RS2 330 may communicate with the base station BS1 304 via the relay station RS1 320. The group of stations MS3 332, MS4 334, may communicate with the base station BS1 304 via the relay station RS2 330, which communicates with the base station BS1 304 via the relay station RS1 320.

FIG. 3b is a diagram of a multi-hop environment according to an example embodiment. A group of wireless nodes 332, 334, which may be mobile stations or subscriber stations (MS/SS) may each be coupled via a wireless link to a wireless node 330. As an example, the wireless nodes 332, 334 may include mobile telephones, wireless digital assistants (PDAs), or other types of wireless access devices, or mobile stations. The term "node" or "wireless node" or "network node" or "network station" may refer, for example, to a wireless station, e.g., a subscriber station or mobile station, an access point or base station, a relay station or other intermediate wireless node, or other wireless computing device, as examples. Wireless node 330 may include, for example, a relay station or other node. Wireless node 330 and other wireless nodes 322, 324 may each be coupled to a wireless node 320 via a wireless link. Wireless node 320 and other wireless nodes 308, 310 may each may be coupled to a wireless node 304 via a wireless link. Wireless node 304 may be, for example, a base station (BS), access point (AP) or other wireless node. Wireless node 304 may be coupled to a fixed network, such as network 306, for example. Frames or data flowing from nodes 332, 334 to 330, 322 324, and 330 to 320, and 308, 310, 320 to node 304 may be referred to as flowing in the uplink (UL) or upstream direction, whereas frames flowing from node 304 to nodes 308, 310, and to node 320 and then to nodes 330, 322, 324, 332, and 334 may be referred to as flowing in the downlink (DL) or downstream direction, for example.

Figure 4A:
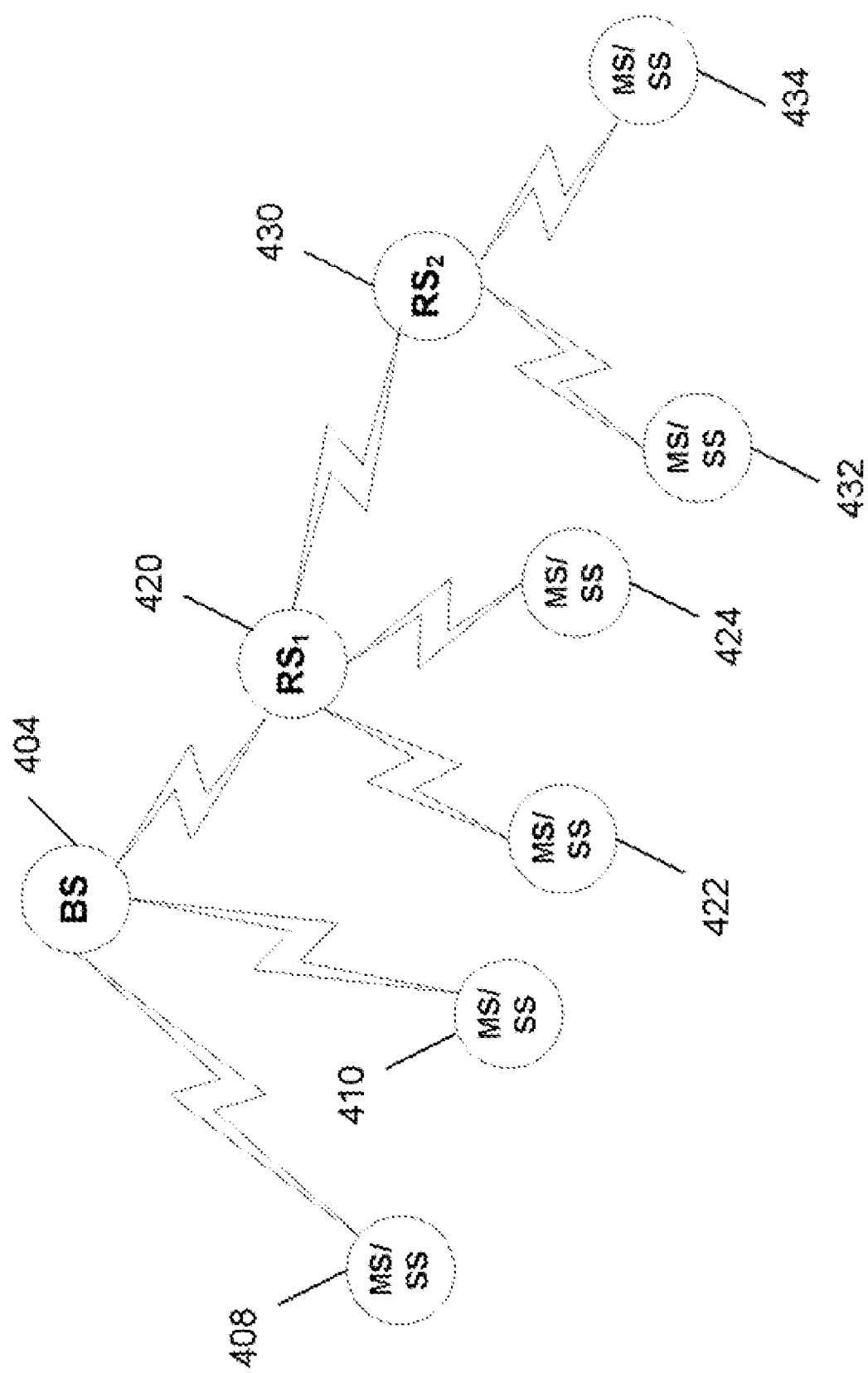
FIGS. 4a-4b are block diagrams illustrating wireless relay networks according to example embodiments.
Figure 4B:
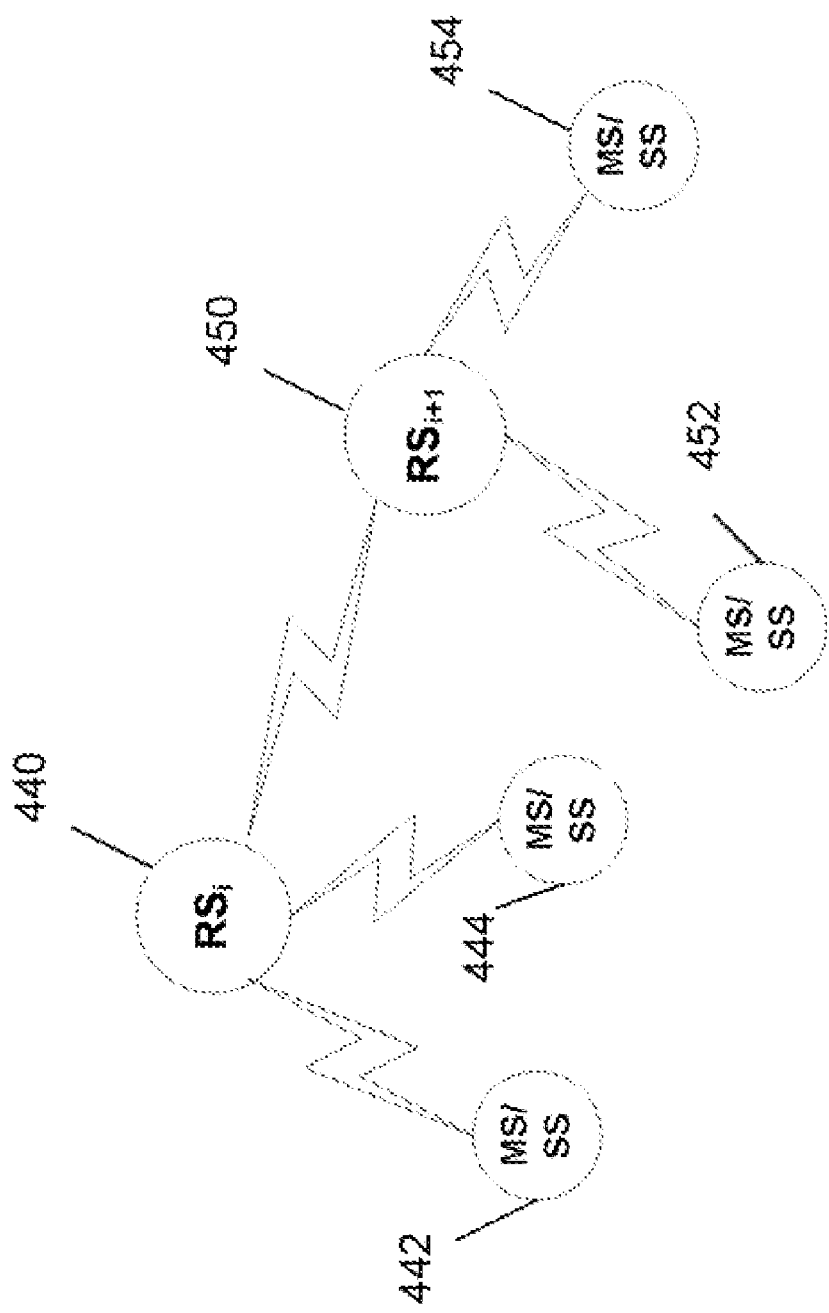

FIGS. 4a-4b are block diagrams illustrating wireless relay networks according to example embodiments. According to an example embodiment, an example relay network may include n levels of RSs. As an example, a two-level-relay-station architecture is illustrated in FIG. 4a. Thus, as shown in the example, MS/SS 408, MS/SS 410, and RS1 420 are coupled to, or directly attached to a base station BS 404.

Similarly, as shown in the example, MS/SS 422, MS/SS 424, and RS2 430 are coupled to, or directly attached to the RS1 420. Further, as shown in the example, MS/SS 432 and MS/SS 434 are coupled to, or directly attached to the relay station RS2 430. The term "attach" may, for example, refer to connecting to a network system or network node over a link, for example, a node may attach to a network system or another node by directly coupling with the other node. The term "attachment" may thus, for example, refer to a connection to a network system or network node over a link, for example, via a direct coupling between network nodes. Generally, a node may attach or connect to a system in order to obtain service from the system via another node.

For the generic example as shown, a wireless node indicated as $RS_0$ may include a base station. According to an example embodiment, one or more relay stations, for example, $RS_i$ 440, $RS_{i+1}$ 450 may receive data units and forward the data units to the next level of the wireless relay network.

Figure 5B:
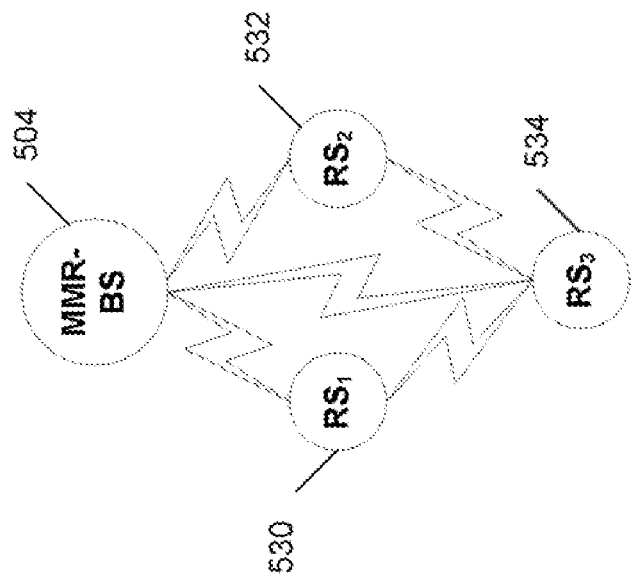
FIGS. 5a-5b are block diagrams illustrating wireless relay networks according to example embodiments.
Figure 5A:
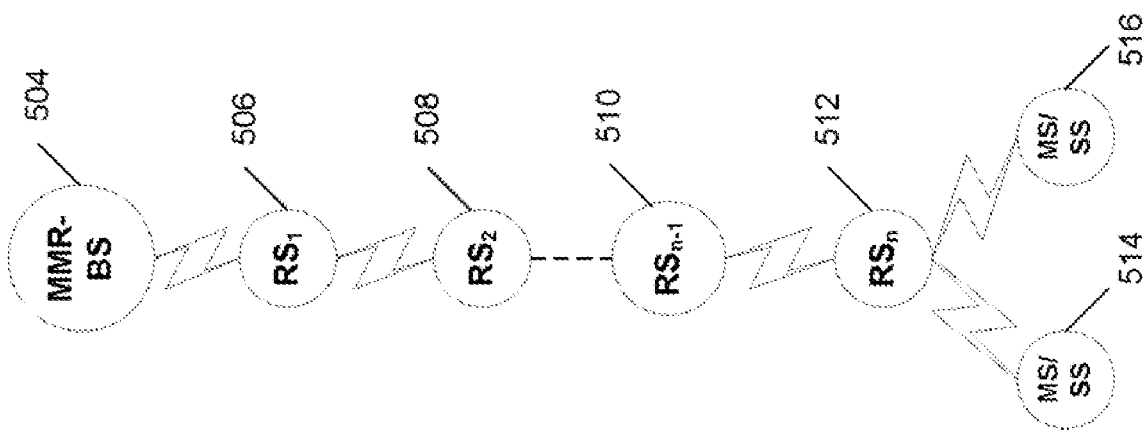

FIGS. 5a-5b are block diagrams illustrating wireless relay networks according to example embodiments. As shown in FIG. 5a, a Mobile Multi-hop Relay base station (MMR-BS) 504 may have a relay station, for example, $RS_1$ 506, directly coupled, or directly attached to MMR-BS 504. Further, as shown, a relay station, for example, $RS_2$ 508 may be directly attached to $RS_1$ 506. Other intermediate network nodes may be included in a communication path between a relay station $RS_{n-1}$ 510 and $RS_2$ 508. Additionally, a relay station $RS_n$ 512 may be attached to $RS_{n-1}$ 510. Multi-hop subscriber stations, for example, MS/SS 514, 516 may be attached to $RS_n$ 512. Thus, as shown in FIG. 5a, there may exist communication paths, for example, between MMR-BS 504 and MS/SS 514 and between MMR-BS 504 and MS/SS 516. For example, a communication path between MMR-BS 504 and MS/SS 514 may include MMR-BS 504, $RS_1$ 506, $RS_2$ 508, $RS_{n-1}$ 510, $RS_n$ 512, and all network nodes in a communication path between $RS_2$ 508 and $RS_{n-1}$ 510. As another example, a communication path between MMR-BS 504 and MS/SS 516 may include MMR-BS 504, $RS_1$ 506, $RS_2$ 508, $RS_{n-1}$ 510, $RS_n$ 512, and all network nodes in a communication path between $RS_2$ 508 and $RS_{n-1}$ 510. The MS/SS 514, 516 may also include mobile stations.

As shown in FIG. 5b, a relay station, for example, $RS_3$ 534 may be directly attached to multiple network nodes, for example, relay stations $RS_1$ 530, $RS_2$ 532, which may both be directly attached to a base station, for example, MMR-BS 504. Thus, for the example shown in FIG. 5b, there may exist two or more communication paths between MMR-BS 504 and $RS_3$ 534: for example, a communication path that includes MMR-BS 504, $RS_1$ 530, and $RS_3$ 534, and a communication path that includes MMR-BS 504, $RS_2$ 532, and $RS_3$ 534. For example, one of the communication paths may include an uplink (UL) communication path between MMR-BS 504 and $RS_3$ 534 and another may include a downlink (DL) communication path between MMR-BS 504 and $RS_3$ 534.

The various example embodiments described herein may be applicable to a wide variety of networks and technologies, such as WLAN networks (e.g., IEEE 802.11 type networks), IEEE 802.16 WiMAX networks, 802.16 Mobile Multi-hop Relay (MMR) networks, as referenced in IEEE 802.16 WG, WiMedia networks, Ultra Wide Band networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various example embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

A wireless relay network may be an example of a multi-hop system in which end nodes, for example, mobile stations or subscriber stations (MS/SS), may be connected to a base station via one or more relay stations, such as RS1 320 and RS2 330, for example. Traffic between the mobile stations or subscriber stations and the base station may pass through, and be processed by, the relay stations RS1 320 and RS2 330, for example. As an example, a relay station may be used to extend the network coverage and/or enhance the system throughput. For example, the traffic sent from a relay station may be scheduled by the relay station itself or scheduled by the base station instead. In some cases, a relay station may receive and decode a frame from a base station, and then forward the frame to the respective mobile station or subscriber station.

The term "wireless node" or "network station" or "node," or the like, may include, for example, a wireless station, such as a mobile station or subscriber station, an access point (AP) or base station, a relay station, a wireless personal digital assistant (PDA), a cell phone, an 802.11 WLAN phone, a WiMedia device, a WiMAX device, a wireless mesh point, or any other wireless device. These are merely a few examples of the wireless devices and technologies that may be used to implement the various example embodiments described herein, and this disclosure is not limited thereto.

In a wireless network system without relay stations, a MS/SS may attach to a base station (BS) directly, and therefore, the BS is aware of the route (i.e., only the one-hop route) to each of the attached MS/SS. However, when a relay station (RS) is introduced between a MS/SS and a BS, an initial attachment request, e.g., a Ranging Request (RNG-REQ) in accordance with IEEE 802.16, may be sent from the MS/SS to the BS through one or more RSs. If there are two or more RSs on the path between a MS/SS and a BS, e.g., as discussed regarding MMR-BS 504, $RS_1$ 506, . . . , $RS_n$ 512, MS/SS 514 with regard to FIG. 5*a*, then upon receiving the initial attachment request, the BS, e.g., MMR-BS 504 may be able to determine the last RS, e.g., $RS_1$ 506, on the path from the MS/SS 514 to the MMR-BS 504 as shown in FIG. 5*a*, but not all the other RSs on the path. Thus the BS, e.g., MMR-BS 504 may not be able to obtain the topology as well as the routing path between the MS/SS, e.g., MS/SS 514 and the BS, e.g., MMR-BS 504.

However, in scenarios such as, e.g., centralized scheduling wherein a BS may schedule the resources for traffic transmissions over every segment on the path between a MS/SS and the BS, the BS may need to determine an exact path between a MS/SS and the BS. If the BS is able to determine the exact path, then as a result of determining a route between the MS/SS and the BS, the BS may determine information relating to the number of hops, the radio condition, etc., on each path. Such information may be used, for example, for the BS to determine scheduling algorithms during regular traffic sessions or during handover.

According to an example embodiment, when a RS, e.g., $RS_1$ 506 as shown in FIG. 5*a*, attaches directly to a BS, e.g., MMR-BS 504, the BS may record the path to the RS as a direct link. For example, the BS may store information associated with the path as network topology information, for example, in a storage device associated with the BS.

The term "network topology" may refer, for example, to a pattern of links connecting pairs of nodes of a network. Thus, a given node may have one or more links to other nodes, and the links may appear in a variety of different shapes. For example, a simple connection may include a one-way link between two devices. More generally, the term "network topology" or "topology" may be used to describe a configuration of a computer network. Thus, for example, each of FIGS. 1-5*b* may be understood to represent various network topologies.

When a RS, e.g., $RS_2$ 508 in FIG. 5*a*, acting as a MS/SS attaches to the system, e.g., via $RS_1$ 506, e.g., by a direct coupling with $RS_1$ 506, $RS_2$ 508 may send an attachment request, for example, via a ranging request message. Upon receiving the attachment request, $RS_1$ 506, e.g., may stamp its signature, e.g., a RS identifier associated with $RS_1$ 506, to the attachment request and may forward the modified attachment request to the BS, e.g., the MMR-BS 504. Upon receiving the attachment request from $RS_2$ 508 with the signature of $RS_1$ 506, the BS, e.g., MMR-BS 504, may determine that $RS_2$ 508 is attached to the system via $RS_1$ 506. Since MMR-BS 504 may have already determined the route between MMR-BS 504 and $RS_1$ 506, e.g., as a result of the $RS_1$ 506 attachment process, MMR-BS 504 may determine the topology and/or a path between MMR-BS 504 and $RS_2$ 508. The BS, e.g., MMR-BS 504 may then update its network topology information, e.g., to indicate a communication path between MMR-BS 504 and $RS_2$ 508 that includes $RS_1$ 506.

According to an example embodiment, this technique may be extended as other network nodes attach to network nodes in the current network topology. Thus, when a RS, e.g., $RS_n$ 512 in FIG. 5*a*, acting as a MS/SS, attaches to the system, e.g., via $RS_{n-1}$ 510, $RS_n$ 512 may send an attachment request, for example, via a ranging request message. Upon receiving the attachment request, $RS_{n-1}$ 510 may stamp its signature to the attachment request and forward the modified attachment request to the BS, e.g., MMR-BS 504. Any other RSs beyond $RS_{n-1}$ 510 in the relevant communication path may simply forward the modified attachment request to the next hop. Upon receiving the modified attachment request from $RS_n$ 512 with the signature of $RS_{n-1}$ 510 (e.g., an RS-ID associated with $RS_{n-1}$ 510), the BS, e.g., MMR-BS 504 may determine that $RS_n$ 512 is attached to the system via $RS_{n-1}$ 510. Since MMR-BS 504 may have already determined the route between the MMR-BS 504 and $RS_{n-1}$ 510, e.g., as a result of the $RS_n$ 512 attachment process, MMR-BS 504 may determine the topology and/or a path between MMR-BS 504 and RS$_n$ 512. MMR-BS 504 may then update the network topology information to indicate a communication path between MMR-BS 504 and RS$_n$ 512.

When a MS/SS, e.g., MS/SS 514 attaches to the system via RS$_n$ 512, the MS/SS 514 may send an attachment request, for example, via a ranging request message. Upon receiving the attachment request, RS$_n$ 512 may stamp its signature (e.g., an RS-ID associated with RS$_n$ 512) to the attachment request and forward the modified attachment request to the BS e.g., MMR-BS 504. Any other RSs beyond RS$_n$ 512 (e.g., RS$_{n-1}$ 510, RS$_2$ 508, RS$_1$ 506) may simply forward the modified attachment request to the next hop. Upon receiving the modified attachment request from the MS/SS 514 with the signature of RS$_n$ 512, the BS, e.g., MMR-BS 504 may determine that the MS/SS 514 is attached to the system via RS$_n$ 512. Since the MMR-BS 504 may have already determined the route, e.g., communication path, between the MMR-BS 504 and RS$_n$ 512 e.g., as a result of the RS$_n$ 512 attachment process, the MMR-BS 504 may determine the topology and/or a route or communication path between the MMR-BS 504 and MS/SS 514. MMR-BS 504 may then update the network topology information to indicate the communication path between MMR-BS 504 and MS/SS 514.

According to an example embodiment, a signature or stamp of a RS may include, for example, a RS-ID or other form of identity that may uniquely identify the RS. According to an example embodiment, the attachment request may include a ranging request (RNG-REQ) message. According to an example embodiment, the signature or stamp of the RS may be added to a received RNG-REQ message, e.g., by adding to the RNG-REQ message a type/length/value (TLV) field including an RS-ID before forwarding the modified RNG-REQ message to the next hop toward the MMR-BS 504.

The techniques described herein may be used in accordance with an IEEE 802.16 system, wherein the attachment request may include, for example, a ranging request (RNG-REQ) message as specified by IEEE 802.16, with enhancements including the RS signature. However, it is understood that the techniques described herein may apply to any type of network system, including network systems other than IEEE 802.16 network systems.

A ranging request (RNG-REQ) message, for example as specified by IEEE 802.16, may be transmitted by a MS/SS at initialization and periodically, for example, to determine network delay and to request power and/or a downlink burst profile change. The RNG-REQ message may be sent, for example, in initial ranging and data grant intervals.

An example format of an example ranging request message is shown in Table 1 below.

TABLE 1

Example RNG-REQ message format

| Syntax | Size | Notes |
|---|---|---|
| RNG-REQ( ) { | | |
| Management Message Type = 4 | 8 bits | |
| Downlink Channel ID | 8 bits | |
| TLV Encoded Information | variable | TLV specific |
| } | | |

As shown, a RNG-REQ message may include type/length/value (TLV) fields. According to an example embodiment, a TLV field may include an RS-ID TLV field, which may include an identifier associated with a RS. It is understood that a format of a RNG-REQ message may differ from the format shown in Table 1 without diverging from the scope of the present discussion. The RNG-REQ message may also include a management message type field, indicating, for example, a type of management message, for example, a type of MAC management message.

A type/length/value (TLV) scheme, for example as specified by IEEE 802.16 generally, may include a formatting scheme that adds a tag to each transmitted parameter that includes the parameter type (and implicitly the encoding rules) and the length of the encoded parameter.

However, according to an example embodiment, the identification of the RS discussed previously may be encoded as a TLV field included in a RNG-REQ message that is being transmitted to a base station.

A ranging response (RNG-RSP) message, for example as specified by IEEE 802.16 generally, may be transmitted by a BS in response to a received RNG-REQ message. In addition, it may be transmitted asynchronously to send corrections based on measurements that have been made on other received data or medium access control (MAC) messages. As a result, an MS/SS may be prepared to receive a RNG-RSP message at any time, not just following a RNG-REQ transmission.

An example format of an example ranging response message is shown in Table 2 below.

TABLE 2

Example RNG-RSP message format

| Syntax | Size | Notes |
|---|---|---|
| RNG-RSP( ) { | | |
| Management Message Type = 5 | 8 bits | |
| Uplink Channel ID | 8 bits | |
| TLV Encoded Information | variable | TLV specific |
| } | | |

As shown, the RNG-RSP message may also include TLV fields. An example RNG-RSP message may include, for example, timing adjust information, power adjust information, a basic connection identifier (CID) for initial ranging, a subscriber station (SS) medium access control (MAC) address for initial ranging, frequency adjust information, etc.

Thus, for example, when a MS/SS or RS conducts initial ranging, it may send an initial ranging request (RNG-REQ) message. According to an example embodiment, when a RS receives a RNG-REQ without an attached-RS-ID TLV field, the RS may stamp its signature, for example, by including its associated RS-ID in an attached-RS-ID TLV field and inserting the attached-RS-ID TLV field into the RNG-REQ message. It may then forward the modified RNG-REQ message to the next hop.

When a RS receives a RNG-REQ message with an attached-RS-ID TLV field, it may simply forward the RNG-REQ message to the next hop. When a MMR-BS receives a RNG-REQ message without an attached-RS-ID TLV field from a MS/SS or RS (RS$_i$), the MMR-BS may determine that the MS/SS or RS$_i$ sending the RNG-REQ message is directly attaching to the MMR-BS itself and is only one hop away. The MMR-BS may then update its network topology information to indicate that the attaching MS/SS or RS (RS$_i$) is directly attached to the MMR-BS. Thus, a communication between the MMR-BS and the attaching MS/SS or RS (RS$_i$) may be established and information relating to the communication path may be included as part of updating the network topology information.

According to an example embodiment, when a MMR-BS receives a RNG-REQ message with an attached-RS-ID field from a MS/SS or RS ($RS_i$), the MMR-BS may retrieve the RS-ID included in the attached-RS-ID TLV field and determine that the MS/SS or RS ($RS_i$) sending the RNG-REQ message is attaching to the system by directly coupling with the RS ($RS_k$) identified by the RS-ID. Since the MMR-BS may have already determined a communication path between $RS_k$ and itself using the same mechanism as discussed previously, the MMR-BS may determine the topology and/or a route or communication path between the MS/SS or $RS_i$ and the MMR-BS, for example, by combining the already-determined MMR-BS-to-$RS_k$ path with the single hop path between $RS_k$ and the MS/SS or $RS_i$. The MMR-BS may thus update its network topology information in accordance with the updated communication path.

According to an example embodiment, operations of updating network topology information may also be performed locally by each $RS_i$ along the route or communication path as the RNG-REQ message is received and forwarded by the respective $RS_i$ at each hop of the route or communication path from the attaching MS/SS or $RS_i$ to the MMR-BS. Thus, according to an example embodiment, each $RS_i$ may also maintain network topology information associated with traffic flowing through the respective $RS_i$.

According to an example embodiment, TLV fields may only be included in RNG-REQ message of adequate UL bandwidth. Thus, for example, according to MMR specifications, when a MS/SS or RS ($RS_i$) transmits an initial ranging request (RNG-REQ) message, the BS may provide for extra UL bandwidth allocation of size at least sufficient for the RS ($RS_j$) to which the MS/SS or $RS_i$ is directly attaching to insert an attached-RS-ID TLV field into the RNG-REQ message.

According to an example embodiment, an attached-RS-ID may be added to the RNG-REQ message by the first RS ($RS_j$) to which a MS/SS or a RS ($RS_i$) directly attaches when the MS/SS or the RS ($RS_i$) is attempting to perform initial entry, re-entry, association or handover to the network via a RS ($RS_j$).

Figure 6:
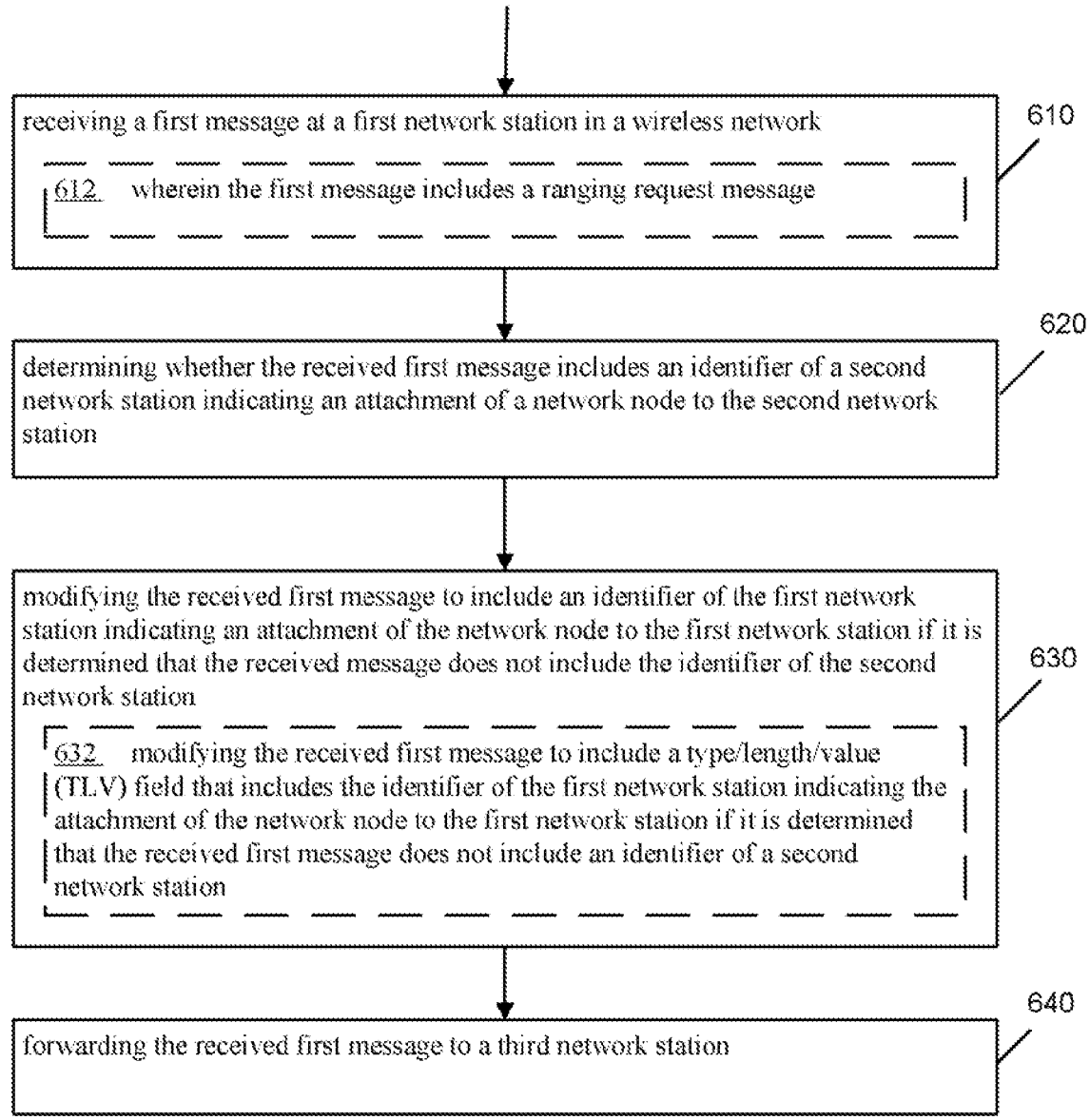
FIG. 6 is a flow chart illustrating operation of a wireless node according to an example embodiment.

FIG. 6 is a flow chart illustrating operation of a wireless node according to an example embodiment. At 610, a first message may be received at a first network station in a wireless network. According to an example embodiment, the first message may, for example, include a ranging request message (610). For example, as discussed previously, $RS_{n-1}$ 510 may receive a RNG-REQ message that may have been sent from $RS_n$ 512 of FIG. 5a.

At 620, it may be determined whether the received first message includes an identifier of a second network station indicating an attachment of a network node to the second network station. For example, $RS_{n-1}$ 510 may determine whether a RNG-REQ message that has been received by $RS_{n-1}$ 510 includes, for example, a RS-ID, for example, in the format of a TLV field included in the RNG-REQ message. For example, the received first message may include any other type of message that may include any type of identifier of the second network station, and is not limited to RNG-REQ messages, nor is it limited to IEEE 802.16 type messages. For example, $RS_{n-1}$ 510 may determine whether a RNG-REQ message that has been received by $RS_{n-1}$ 510 includes, for example, a RS-ID, for example, a RS-ID associated with $RS_n$ 512.

At 630, the received first message may be modified to include an identifier of the first network station indicating an attachment of the network node to the first network station if it is determined that the received message does not include the identifier of the second network station. For example, if $RS_{n-1}$ 510 determines that a received RNG-REQ message does not include a RS-ID, then the RNG-REQ message may be modified to include a RS-ID, for example, an identifier associated with $RS_{n-1}$ 510. Thus the modified RNG-REQ message may serve to indicate, for example, that $RS_n$ 512 is attaching to $RS_{n-1}$ 510.

According to an example embodiment, the received first message may be modified, for example, to include a type/length/value (TLV) field that includes the identifier of the first network station indicating the attachment of the network node to the first network station if it is determined that the received first message does not include an identifier of a second network station (632). At 640, the received first message may be forwarded to a third network station. This, for example, $RS_{n-1}$ 510 may forward the received first message. If $RS_{n-1}$ 510 has not modified the received first message, then $RS_{n-1}$ 510 may forward the first message in the same status as it was received by $RS_{n-1}$ 510. However, if $RS_{n-1}$ 510 has modified the received first message, then $RS_{n-1}$ 510 may forward the first message in its modified form.

As discussed previously, the received first message may then be received and forwarded, for example, by all other RSs on a communication path from $RS_{n-1}$ 510 to MMR-BS 504 (e.g., $RS_2$ 508, $RS_1$ 506). As discussed previously, MMR-BS 504 may receive the received first message and may update the network topology information based on the received first message. According to an example embodiment, all $RS_i$ along the communication path may update local network topology information based on the received first message as the received first message is received and forwarded by each respective $RS_i$ along the communication path or route.

Alternatively, according to another example embodiment, upon receiving a RNG-REQ message from a new MS/SS or RS ($RS_i$), an RS, e.g., $RS_j$ may forward the RNG-REQ message to the next hop, and may send a topology update request (Topology-Update-REQ) message to an MMR-BS to inform the MMR-BS that a new MS/SS or RS ($RS_i$) is attaching to the system via $RS_j$. The MMR-BS may update the network topology information or structure based on such information, as well as on the information it receives before receiving the Topology-Update-REQ message.

According to an example embodiment, the Topology-Update-REQ message may be formatted, for example, in accordance with the example format as shown in Table 3 below. The MMR-BS may then, for example, send a Topology-Update-RSP message to $RS_j$. According to an example embodiment, the Topology-Update-RSP message may be formatted, for example, in accordance with the example format as shown in Table 4 below.

Thus, according to an example embodiment, when a relay station, e.g., $RS_1$ 506 attaches directly to a MMR-BS, e.g., MMR-BS 504, the MMR-BS 504 may record the path to $RS_1$ 506 as a direct link. When another relay station, e.g., $RS_2$ 508 acting as a MS/SS attaches to the system via $RS_1$ 506, e.g., by sending a RNG-REQ message, $RS_1$ 506 may send a topology update request (Topology-Update-REQ) message to the MMR-BS 504 to inform the MMR-BS 504 that $RS_2$ 508 attaches to the system via $RS_1$ 506. Since the MMR-BS 504 may have already determined the topology between MMR-BS 504 and $RS_1$ 506 during a $RS_1$ 506 initial ranging process, the MMR-BS 504 may determine a topology between $RS_2$ 508 and itself.

Continuing in this manner, according to an example embodiment, when a MS/SS or RS attaches to the system, e.g., via a direct coupling with $RS_n$, the MS/SS or RS may send its initial RNG-REQ message. Upon receiving the RNG-REQ message, $RS_n$ may send a Topology-Update-REQ message to the MMR-BS to inform the MMR-BS that the MS/SS or RS attaches to the system via $RS_n$ (e.g., via a direct coupling with $RS_n$). Since the MMR-BS may have already determined the topology between the MMR-BS and $RS_n$ during a $RS_n$ initial ranging process, the MMR-BS may determine the topology between the MS/SS or RS and itself.

Figure 7:
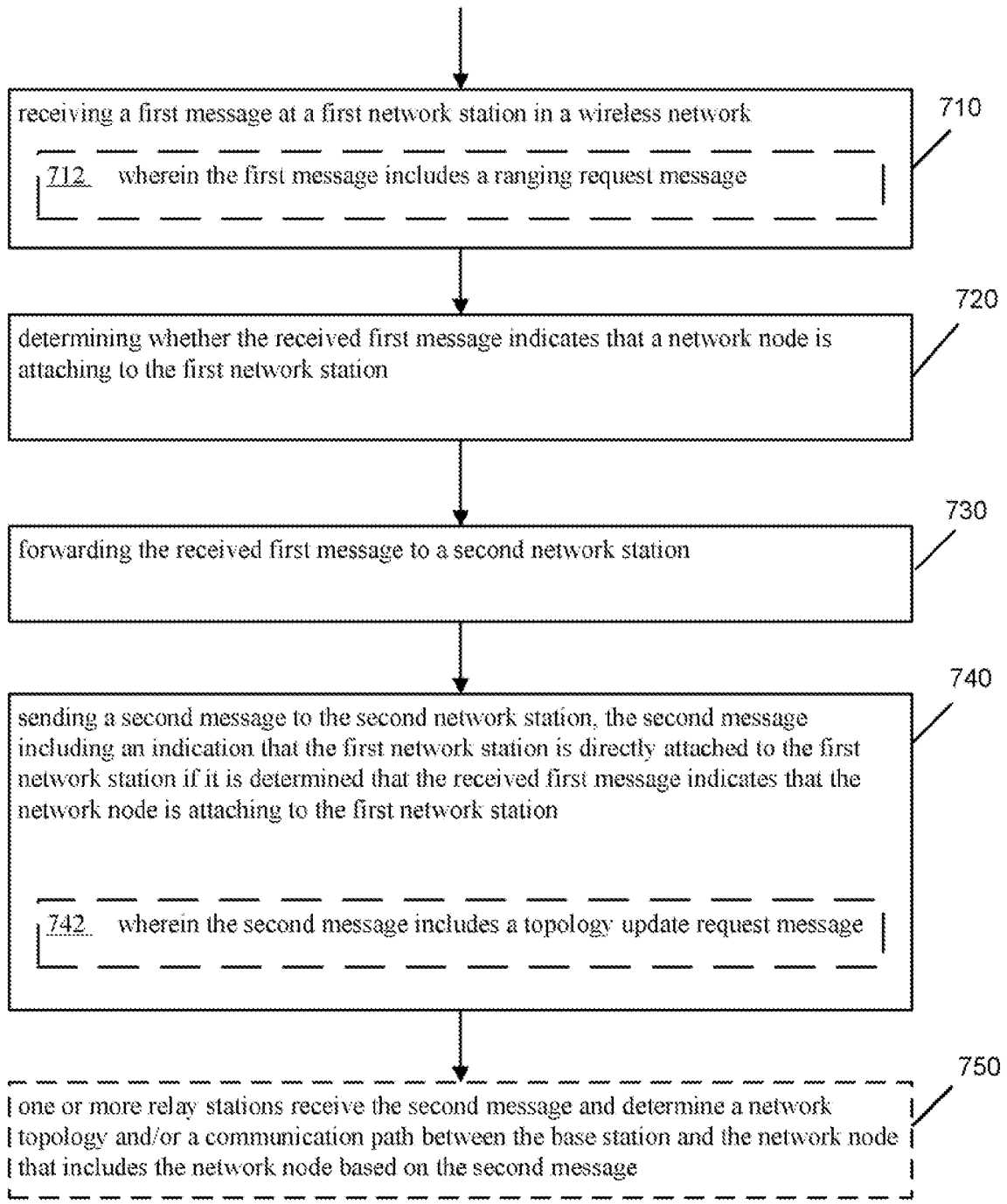
FIG. 7 is a flow chart illustrating operation of a wireless node according to an example embodiment.

FIG. 7 is a flow chart illustrating operation of a wireless node according to an example embodiment. At 710, a first message may be received at a first network station in a wireless network. According to an example embodiment, the first message may include, for example, a ranging request message (712). At 720, it may be determined whether the received first message indicates that a network node is attaching to the first network station. At 730, the received first message may be forwarded to a second network station.

At 740, a second message may be sent to the second network station, the second message including an indication that the network node is directly attached to the first network station if it is determined that the received first message indicates that the network node is attaching to the first network station. According to an example embodiment, the second message, for example, may include a topology update request message (742).

According to an example embodiment, one or more relay stations may receive the second message and determine the topology and/or a communication path between the base station and the network node that includes the network node based on the second message (750).

Similarly, according to an example embodiment, when a directly attached MS/SS or RS ($RS_i$) detaches, for example, terminates an attachment, from a RS ($RS_j$), for example, due to events such as mobility, the RS ($RS_j$) may send a topology update request (Topology-Update-REQ) message to the MMR-BS to inform the MMR-BS that the MS/SS or RS ($RS_i$) is detaching from the system via $RS_j$. Thus, the RS ($RS_j$) may send a Topology-Update-REQ message to the MMR-BS to inform the MMR-BS of the topology change in accordance with the example format as shown in Table 3. Upon receiving the message, the MMR-BS may update the network topology accordingly.

TABLE 3

Example Topology-Update-REQ message format

| Syntax | Size |
| --- | --- |
| Topology-Update-REQ( ) { | |
| Management Message Type | 8 bits |
| Transaction ID | 16 bits |
| TLV Encoded Information | Variable |
| } | |

An example Topology-Update-REQ message may include an MS/SS or RS ID TLV field and/or an Update Type (attach or detach) TLV field.

Upon receiving a Topology-Update-REQ message from a RS, the MMR-BS may update the network topology accordingly and may reply, for example, with a topology update response (Topology-Update-RSP) message, for example, in accordance with the example format shown in Table 4.

TABLE 4

Example Topology-Update-RSP message format

| Syntax | Size |
| --- | --- |
| Topology-Update-RSP( ) { | |
| Management Message Type | 8 bits |
| Transaction ID | 16 bits |
| Confirmation Code | 8 bits |
| } | |

Figure 8:
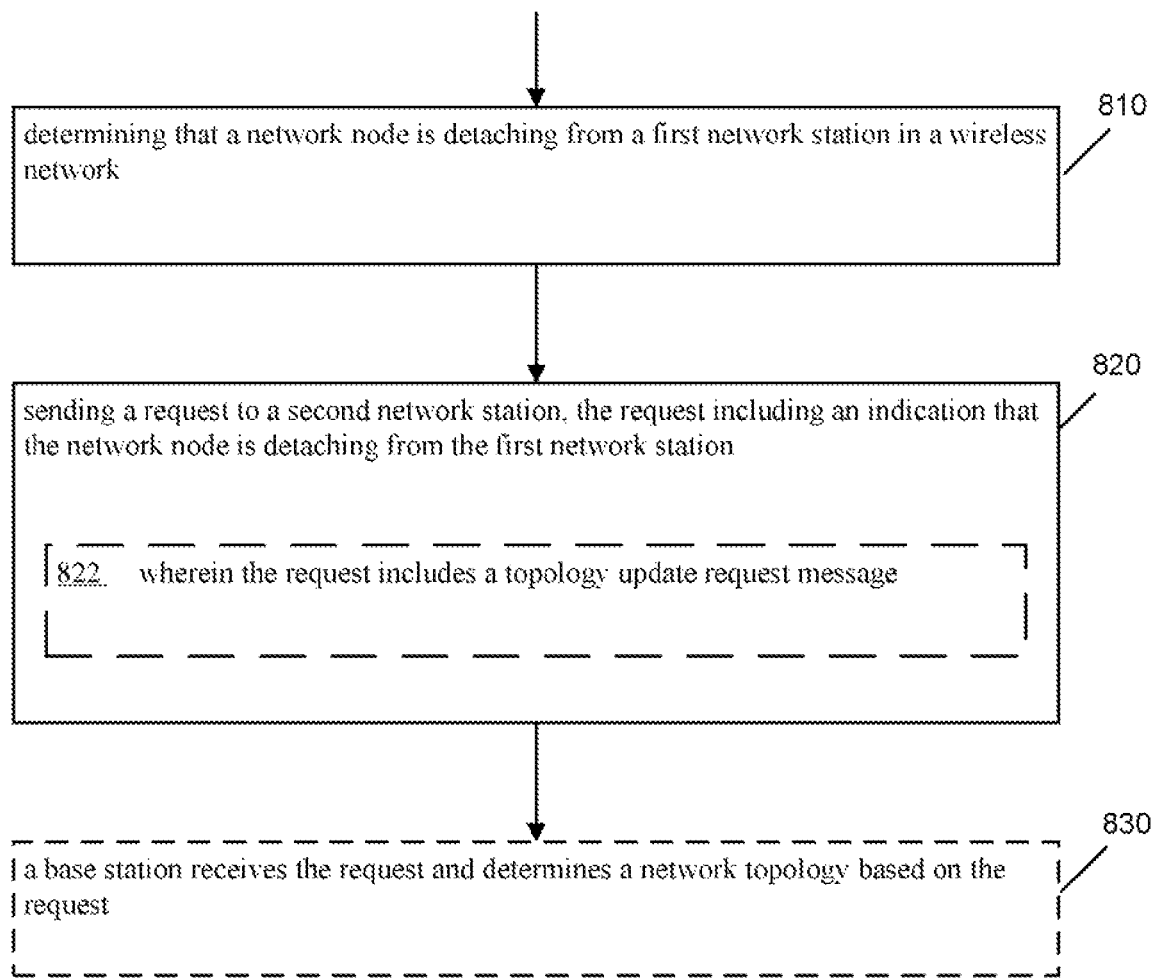
FIG. 8 is a flow chart illustrating operation of a wireless node according to an example embodiment.

FIG. 8 is a flow chart illustrating operation of a wireless node according to an example embodiment. At 810, it may be determined that a network node is detaching from a first network station in a wireless network. At 820, a request may be sent to a second network station, the request including an indication that the network node is detaching from the first network station. According to an example embodiment, the request may include a topology update request message (822).

According to an example embodiment, a base station may receive the request and determine a network topology based on the request (830).

Based on the network topology information obtained from the topology discovery techniques as discussed herein, a MMR-BS, for example, may determine a centralized calculation of a route or communication path between the MMR-BS and any communicating MS/SSs for both an uplink and a downlink direction. Whenever the network topology is updated, for example, due to events such as mobility, the MMR-BS may recalculate the routes or communication paths and may generate new communication paths and/or delete invalid communication paths.

According to an example embodiment, a new RS, acting as a MS/SS, for example, a RS newly attaching to the system, may send an initial RNG-REQ message to all the RSs and/or BS to which it is attaching. For example, $RS_3$ 534 may attach to the system shown in FIG. 5b via a direct coupling with $RS_1$ 530 and a direct coupling with $RS_2$ 532. The RSs to which the new RS attaches may stamp their own signature to the corresponding RNG-REQ message that they receive from the new RS and they may then forward the respective modified RNG-REQ message to the next hop.

When a MMR-BS, e.g., MMR-BS 504 of FIG. 5b receives multiple initial RNG-REQ messages from a RS, e.g., $RS_3$ 534, but with different RS signatures, the MMR-BS 504 may determine that the $RS_3$ 534 attaches to the system via more than one RS, and thus that multiple paths exist between the $RS_3$ 534 and the MMR-BS 504.

According to an example embodiment, when a new path is determined after an initial topology discovery or topology update, a MMR-BS may, for example, send the complete path information to all the RSs on one particular path. According to an example embodiment, the MMR-BS may first establish a multicast group and may invite all the RSs on a path to join the multicast group. The MMR-BS may assign a new multicast address for the multicast group. The MMR-BS may then use the multicast address to send all the management messages that are needed by the RSs that are included on the path. For example, the MMR-BS 504 of FIG. 5a may determine a multicast group including $RS_1$ 506, $RS_2$ 508, . . . , $RS_{n-1}$ 510, $RS_n$ 512 along a communication path between MMR-BS 504 and MS/SS 516.

The MMR-BS may then, for example, send to the multicast group a path advertisement indication or a path advertisement request (Path-Advertisement-REQ) message that may include the complete path information (e.g., indicators associated with the MMR-BS 504, $RS_1$ 506, $RS_2$ 508, ..., $RS_n$ 512, MS/SS 516) and a path identifier. Thus, for example, the path advertisement indication or a path advertisement request may be sent as a multicast message addressed to a multicast group address that includes the addresses (e.g., MAC addresses) of all the RSs in the path between the MS/SS and the MMR-BS as multicast group members. When a RS receives the multicast message, for example, every RS in the path (who is a member of the multicast group) may then route the multicast message to the other RSs on the path based on a defined multicast tree, for example. All members of the multicast group may, for example, share a group authentication key.

After receiving the Path-Advertisement-REQ message, the RSs in the multicast group may store the path information, for example, in a local storage device, and may reply, for example, via a path advertisement response (Path-Advertisement-RSP) message, for example, in accordance with an example format as shown below in Table 6.

According to an example embodiment, the MMR-BS may send the path advertisement indication or a path advertisement request message via a unicast message to each RS included in the particular path. Thus, for example, the path advertisement indication or path advertisement request message may be sent as a unicast message sent to each of the one or more relay stations on the path between the MS/SS and the MMR-BS. With this unicast scheme, however, overhead may increase as the number of RSs on a path increases since a separate message is sent to each RS.

According to an example embodiment, the MMR-BS may send the path advertisement indication or a path advertisement request message via a unicast message to the last RS included in the particular path. Thus, for example, the path advertisement indication or path advertisement request message may be sent as a Z-unicast message addressed to the RS directly attached to the MS/SS. In this example, the message may be sent by the MMR-BS to the RS that is most directly attached to the MS, allowing the message to be received and read by each RS along the path. This may provide a more efficient technique by transmitting one message that is used or read by all RSs along the path. When the message reaches each RS on the path, each RS may retrieve parameters from the message, for example, parameters associated with the communication path.

Thus, according to an example embodiment, an MMR-BS may send a Path-Advertisement-REQ message when it intends to advertise the complete path information to all the RSs included in a communication path. An MMR-BS may, for example, generate Path-Advertisement-REQ messages in accordance with the example format as shown in Table 5.

TABLE 5

Example Path-Advertisement-REQ message format

| Syntax | Size |
|---|---|
| Path-Advertisement-REQ( ) { | |
|   Management Message Type | 8 bits |
|   Transaction ID | 16 bits |
|   TLV Encoded Information | Variable |
| } | |

The Path-Advertisement-REQ message may include, for example, TLV fields indicating a path identifier (Path-ID) and/or Path-Information. The Path-Information may, for example, include identifiers associated with each network node included in the communication path to be advertised.

Upon receiving a Path-Advertisement-REQ message from the MMR-BS, a RS may reply via a path advertisement response (Path-Advertisement-RSP) message, for example, in accordance with the example format as shown in Table 6.

TABLE 6

Example Path-Advertisement-RSP message format

| Syntax | Size |
|---|---|
| Path-Advertisement-RSP( ) { | |
|   Management Message Type | 8 bits |
|   Transaction ID | 16 bits |
|   Confirmation Code | 8 bits |
| } | |

An MMR-BS may send a path cancellation request (Path-Cancellation-REQ) message when it intends to cancel a path and to inform the RSs on path of the cancellation decision as well. According to an example embodiment, if a MMR-BS makes a decision to cancel an existing path, it may send to an associated multicast group a path cancellation request (Path-Cancellation-REQ) message which may include, for example, a path identifier (Path-ID) TLV field. An example of a format for a Path-Cancellation-REQ message is shown in Table 7 below.

TABLE 7

Example Path-Cancellation-REQ message format

| Syntax | Size |
|---|---|
| Path-Cancellation-REQ( ) { | |
|   Management Message Type | 8 bits |
|   Transaction ID | 16 bits |
|   TLV Encoded Information | Variable |
| } | |

A Path-Cancellation-REQ message may include, for example, one or more path identifier (Path-ID) TLV fields.

The RSs that receive the Path-Cancellation-REQ message may then remove the associated record for the path specified by the Path-ID and may, for example, reply via a path cancellation response (Path-Cancellation-RSP message). Thus, upon receiving a Path-Cancellation-REQ message from the MMR-BS, a RS may remove its stored indication of the identified path, for example, a record for the identified path, and may reply, for example, via a Path-Cancellation-RSP message, for example, in accordance with the example format as shown in Table 8.

TABLE 8

Example Path-Cancellation-RSP message format

| Syntax | Size |
|---|---|
| Path-Cancellation-RSP( ) { | |
|   Management Message Type | 8 bits |
|   Transaction ID | 16 bits |
|   Confirmation Code | 8 bits |
| } | |

According to an example embodiment, a MMR-BS may maintain information indicating all the possible paths between a MS/SS and the MMR-BS. Thus, when a new connection is established for an MS/SS, the MMR-BS may select one or more communication paths to carry the traffic for the new connection.

According to an example embodiment, when multiple routes or communication paths exist between a MMR-BS and a MS/SS, the MMR-BS may select a particular path, e.g., based on network parameters or metrics that may include but are not limited to link condition, load condition, overall delay, etc.

According to an example embodiment, to inform all the RSs on the selected paths of the traffic information, the MMR-BS may send a path selection indication or path selection request (Path-Selection-REQ) message to a multicast group to which all the RSs on the selected path belong (e.g., a Path-Selection-REQ message in accordance with an example format as shown below in Table 9). The Path-Selection-REQ message may include, for example, a connection identifier (CID) of the connection, a path identifier (path-id), and optionally a service flow indicator (SFID) and/or a quality of service (QoS) requirement associated with the service flow.

According to an example embodiment, as used in the context of IEEE 802.16 systems, a connection identifier (CID) may identify a connection to equivalent peers in the medium access control (MAC) layer of a BS and SS. The CID may map to a service flow indicator (SFID), which may define the QoS parameters of the service flow associated with that connection.

According to an example embodiment, when a RS on the path receives the Path-Selection-REQ message, it may record the information, which may be used by the RS to route traffic based on a path that may be specified, for example, in accordance with an example path advertisement technique. If the SFID and the QoS requirement are also present, the RS may also record such information that may be used for scheduling. Each RS that receives the Path-Selection-REQ message may then reply, for example, via a path selection confirmation or path selection response (Path-Selection-RSP) message, e.g., a Path-Selection-RSP message in accordance with an example format as shown below in Table 10, to the MMR-BS.

According to an example embodiment, the MMR-BS may select one or more paths for a particular connection. According to an example embodiment, the MMR-BS may select asymmetric paths for uplink and downlink traffic.

After selecting one or more paths to carry the traffic for a new connection, a MMR-BS may send a Path-Selection-REQ message, for example, in accordance with the example format as shown below in Table 9, to a multicast group to which all the RSs on the selected path belong.

TABLE 9

Example Path-Selection-REQ message format

| Syntax | Size |
|---|---|
| Path-Selection-REQ( ) { | |
| Management Message Type | 8 bits |
| Transaction ID | 16 bits |
| TLV Encoded Information | Variable |
| } | |

A Path-Selection-REQ message may, for example, include one or more path identifier (Path-ID) and/or connection identifier (CID) TLV fields. Further, a Path-Selection-REQ message may, for example, include one or more service flow parameter TLV fields.

Upon receiving a Path-Selection-REQ message from the MMR-BS, a RS may retrieve and record the relevant information and may reply, for example, via a path selection response (Path-Selection-RSP) message, for example, in accordance with the example format as shown in Table 10.

TABLE 10

Example Path-Selection-RSP message format

| Syntax | Size |
|---|---|
| Path-Selection-RSP( ) { | |
| Management Message Type | 8 bits |
| Transaction ID | 16 bits |
| Confirmation Code | 8 bits |
| } | |

According to an example embodiment, if a single new RS, e.g., $RS_3$ 534 of FIG. 5b attempts to attach to an MMR system via multiple paths (e.g., via one or more paths), the new RS may generate a RNG-REQ message or RNG-REQ messages that includes the RS-ID(s) associated with any network stations to which the new RS wishes to attach. Thus, there is no need for any intermediate node between the new RS and the base station to modify the RNG-REQ message.

For example, if $RS_3$ 534 of FIG. 5b attempts to attach to the system of FIG. 5b, e.g., by directly coupling with $RS_n$ 530 and $RS_2$ 532, the new RS, e.g., $RS_3$ 534 may itself generate a RNG-REQ message or RNG-REQ messages that include the RS-ID(s) associated with any network stations to which the new RS wishes to attach. For example, the $RS_3$ 534 may generate RNG-REQ messages that include the RS-IDs of $RS_1$ 530 and $RS_2$ 532 if $RS_3$ 534 wishes to attach to both $RS_n$ 530 and $RS_2$ 532 and then send the RNG-REQ message(s).

According to an example embodiment, the $RS_3$ 534 may send RNG-REQ messages that do not include the RS-IDs of $RS_n$ 530 and $RS_2$ 532, but may instead, e.g., send a second message, e.g. a topology update message associated with each of $RS_n$ 530 and $RS_2$ 532, to indicate to MMR-BS 504 that $RS_3$ 534 is attaching to both $RS_n$ 530 and $RS_2$ 532.

If multiple communication paths are available between the MMR-BS 504 and a MS/SS and/or any intermediate RSs, the MMR-BS 504 may select an appropriate communication path (or appropriate communication paths) for communicating with any of the MS/SS and/or any intermediate RSs, e.g., based on the selection techniques discussed previously.

As another example, if $RS_n$ 512 of FIG. 5a wishes to attach to $RS_{n-1}$ 510, the $RS_n$ 512 may generate a RNG-REQ message that includes a RS-ID of $RS_{n-1}$ 510 and then send the RNG-REQ message.

According to an example embodiment, the $RS_n$ 512 may send a RNG-REQ message that does not include the RS-ID of $RS_{n-1}$ 510, but may instead, e.g., send a second message, e.g. a topology update message associated with $RS_{n-1}$ 510, to indicate to MMR-BS 504 that $RS_n$ 512 is attaching to $RS_{n-1}$ 510.

Figure 9:
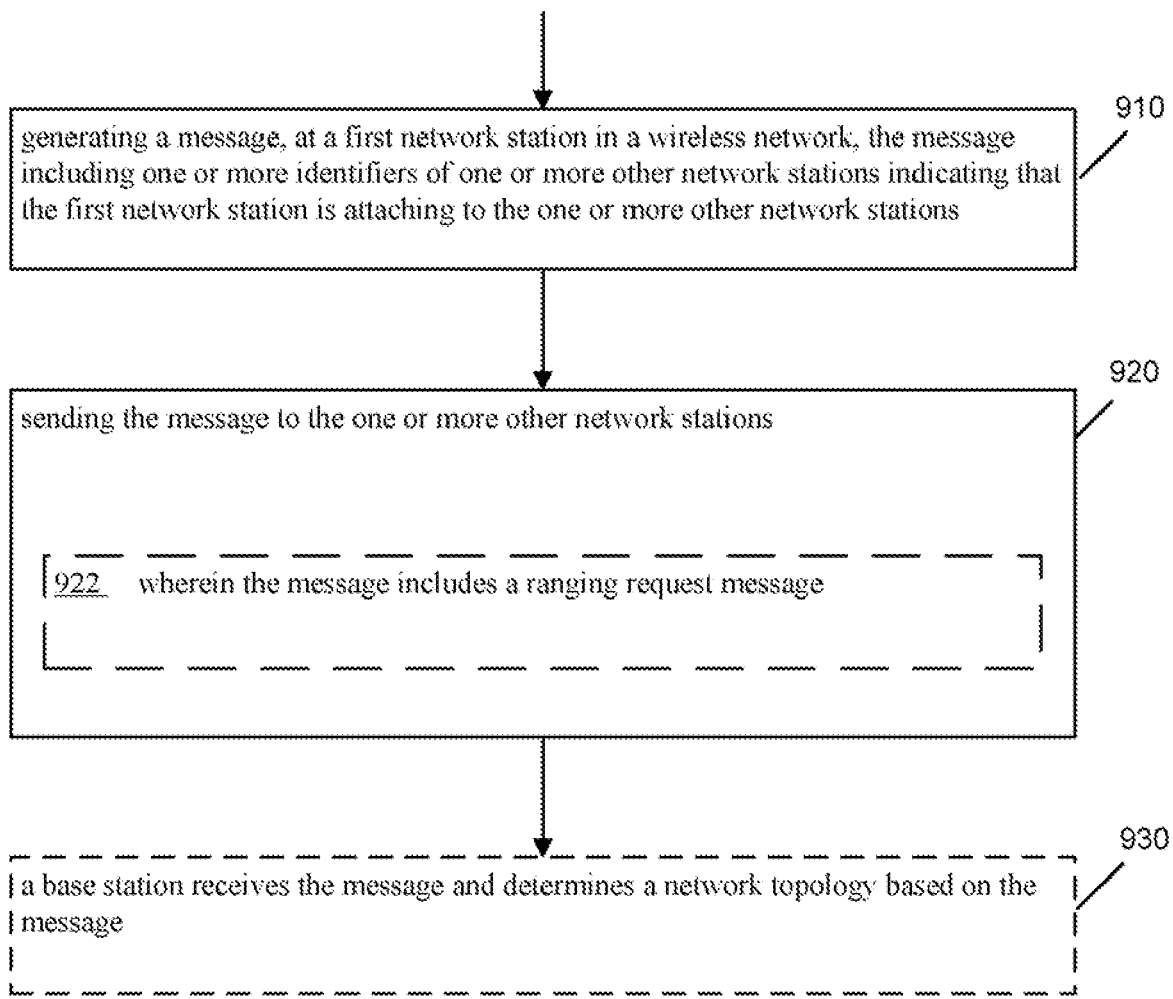
FIG. 9 is a flow chart illustrating operation of a wireless node according to an example embodiment.

FIG. 9 is a flow chart illustrating operation of a wireless node according to an example embodiment. At 910, a message may be generated, at a first network station in a wireless network, the message including one or more identifiers of one or more other network stations indicating that the first network station is attaching to the one or more other network stations. For example, as discussed previously, $RS_n$ 512 of FIG. 5a may wish to attach, e.g., to $RS_{n-1}$ 510, and may thus send, e.g., a ranging request message including a RS-ID associated with $RS_{n-1}$ 510, or $RS_n$ 512 may send, e.g., a topology update request message including a RS-ID associated with $RS_{n-1}$ 510.

For example, as discussed previously, $RS_3$ 534 of FIG. 5*b* may wish to attach to at least $RS_1$ 530 and $RS_2$ 532, and thus $RS_3$ 534 may, e.g., send a ranging request message including RS-IDs associated with both of $RS_1$ 530 and $RS_2$ 532. Alternatively, $RS_3$ 534 of FIG. 5*b* may send a ranging request message to each of $RS_1$ 530 and $RS_2$ 532, each ranging request message including an RS-ID associated with a respective one of $RS_1$ 530 and $RS_2$ 532.

For example, as discussed previously, if $RS_3$ 534 of FIG. 5*b* attempts to attach to the system of FIG. 5*b*, e.g., by directly coupling with $RS_1$ 530 and $RS_2$ 532, then $RS_3$ 534 may itself generate a RNG-REQ message or RNG-REQ messages that include the RS-ID(s) associated with any network stations to which the new RS wishes to attach. For example, the $RS_3$ 534 may generate RNG-REQ messages that include the RS-IDs of $RS_1$ 530 and $RS_2$ 532 if $RS_3$ 534 wishes to attach to both $RS_1$ 530 and $RS_2$ 532 and then send the RNG-REQ message(s).

According to an example embodiment, the $RS_3$ 534 may instead, e.g., send, e.g. a topology update message associated with each of $RS_n$ 530 and $RS_2$ 532, to indicate to MMR-BS 504 that $RS_3$ 534 is attaching to both $RS_n$ 530 and $RS_2$ 532.

At 920, the message may be sent to the one or more other network stations. According to an example embodiment, the message may include a ranging request message (922).

According to an example embodiment, a base station may receive the message and determine a network topology based on the message (930).

Figure 10:
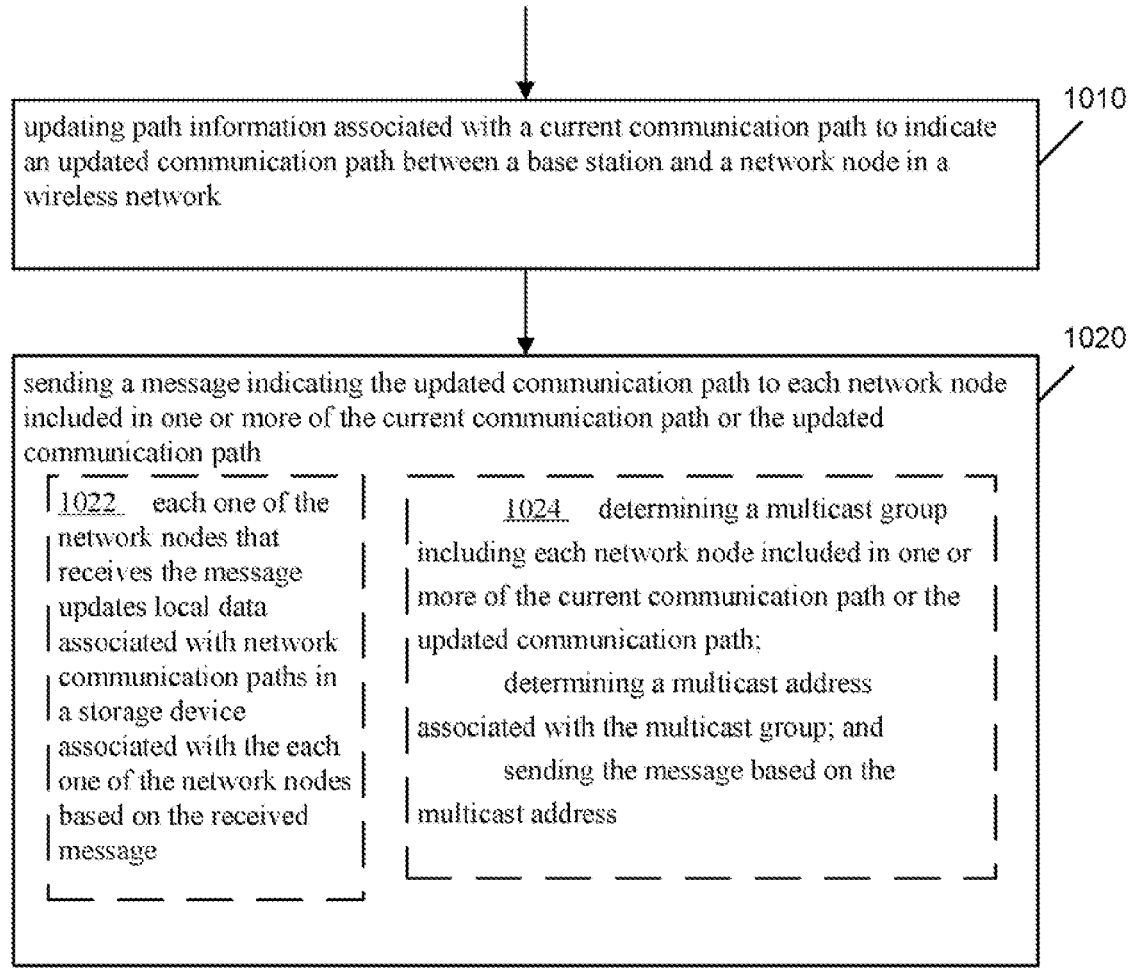
FIG. 10 is a flow chart illustrating operation of a wireless node according to an example embodiment.

FIG. 10 is a flow chart illustrating operation of a wireless node according to an example embodiment. At 1010, path information associated with a current communication path may be updated to indicate an updated communication path between a base station and a network node in a wireless network. At 1020, a message indicating the updated communication path may be sent to each network node included in one or more of the current communication path or the updated communication path.

According to an example embodiment, each one of the network nodes that receives the message may update local data associated with network communication paths in a storage device associated with the each one of the network nodes based on the received message (1022). According to an example embodiment, the sending the message may include determining a multicast group including each network node included in one or more of the current communication path or the updated communication path, determining a multicast address associated with the multicast group, and sending the message based on the multicast address (1024).

Figure 11:
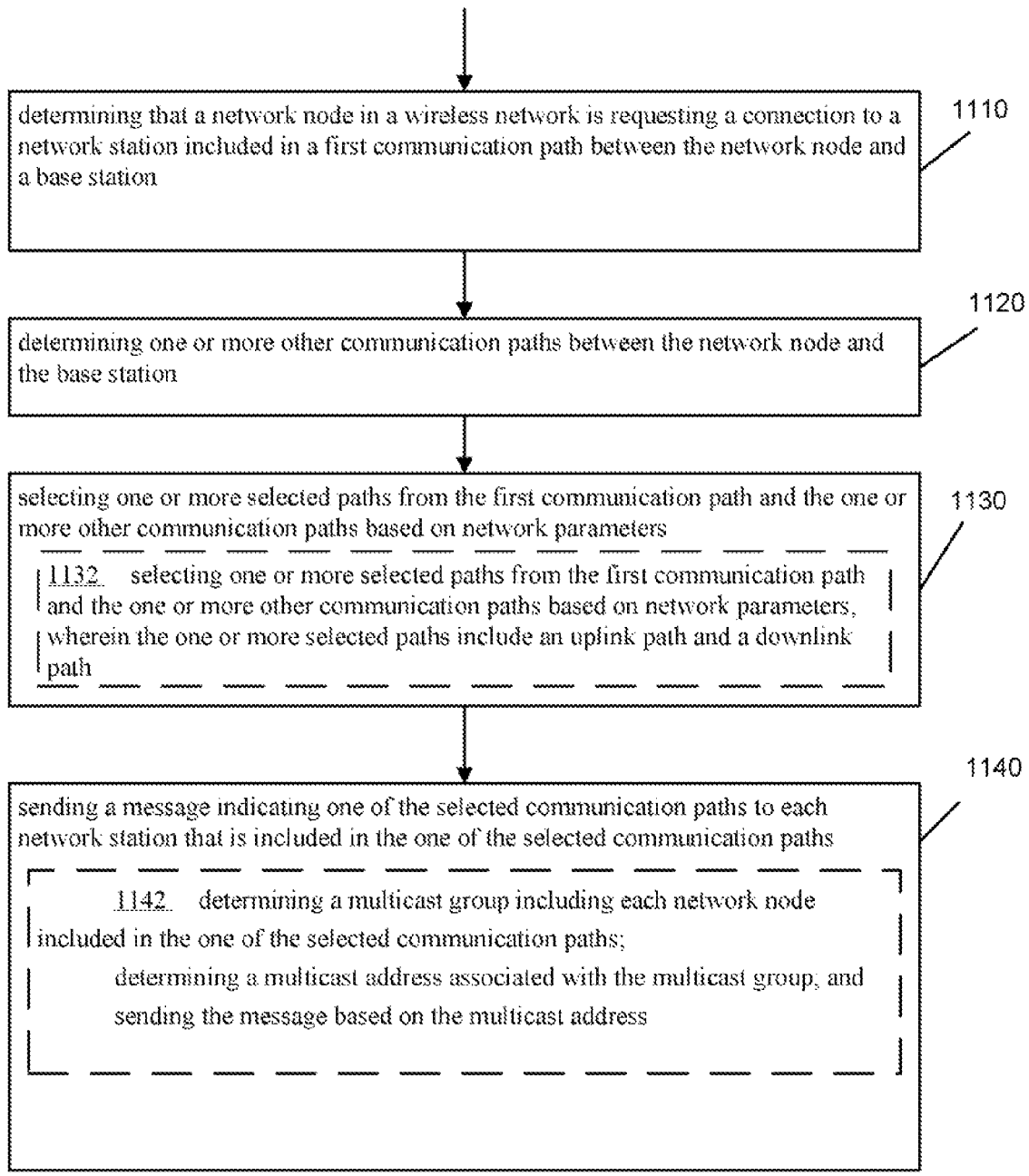
FIG. 11 is a flow chart illustrating operation of a wireless node according to an example embodiment.

FIG. 11 is a flow chart illustrating operation of a wireless node according to an example embodiment. At 1110, it may be determined that a network node in a wireless network is requesting a connection to a network station included in a first communication path between the network node and a base station. For example, it may be determined that $RS_3$ 534 of FIG. 5*b* may request a connection to $RS_n$ 530, which may be included in a communication path between $RS_3$ 534 and MMR-BS 504.

At 1120, one or more other communication paths between the network node and the base station may be determined. For example, a communication path including MMR-BS 504, $RS_2$ 532, and $RS_3$ 534 may be determined. At 1130, one or more selected paths may be selected from the first communication path and the one or more other communication paths based on network parameters. For example, a path including $RS_1$ 530 may be selected, or a path including $RS_2$ 532 may be selected based on network parameters or metrics. For example, such network parameters or metrics may include but are not limited to link condition, load condition, overall delay, etc.

According to an example embodiment, the selecting may include selecting one or more selected paths from the first communication path and the one or more other communication paths based on network parameters, wherein the one or more selected paths include an uplink path and a downlink path (1132). For example, a path including $RS_1$ 530 may be selected for an uplink flow, and a path including $RS_2$ 532 may be selected for a downlink flow based on network parameters.

At 1140, a message indicating one of the selected communication paths may be sent to each network station that is included in the one of the selected communication paths. According to an example embodiment, the sending of the message may include determining a multicast group including each network node included in the one of the selected communication paths, determining a multicast address associated with the multicast group, and sending the message based on the multicast address (1142).

Figures 12A, 12B:
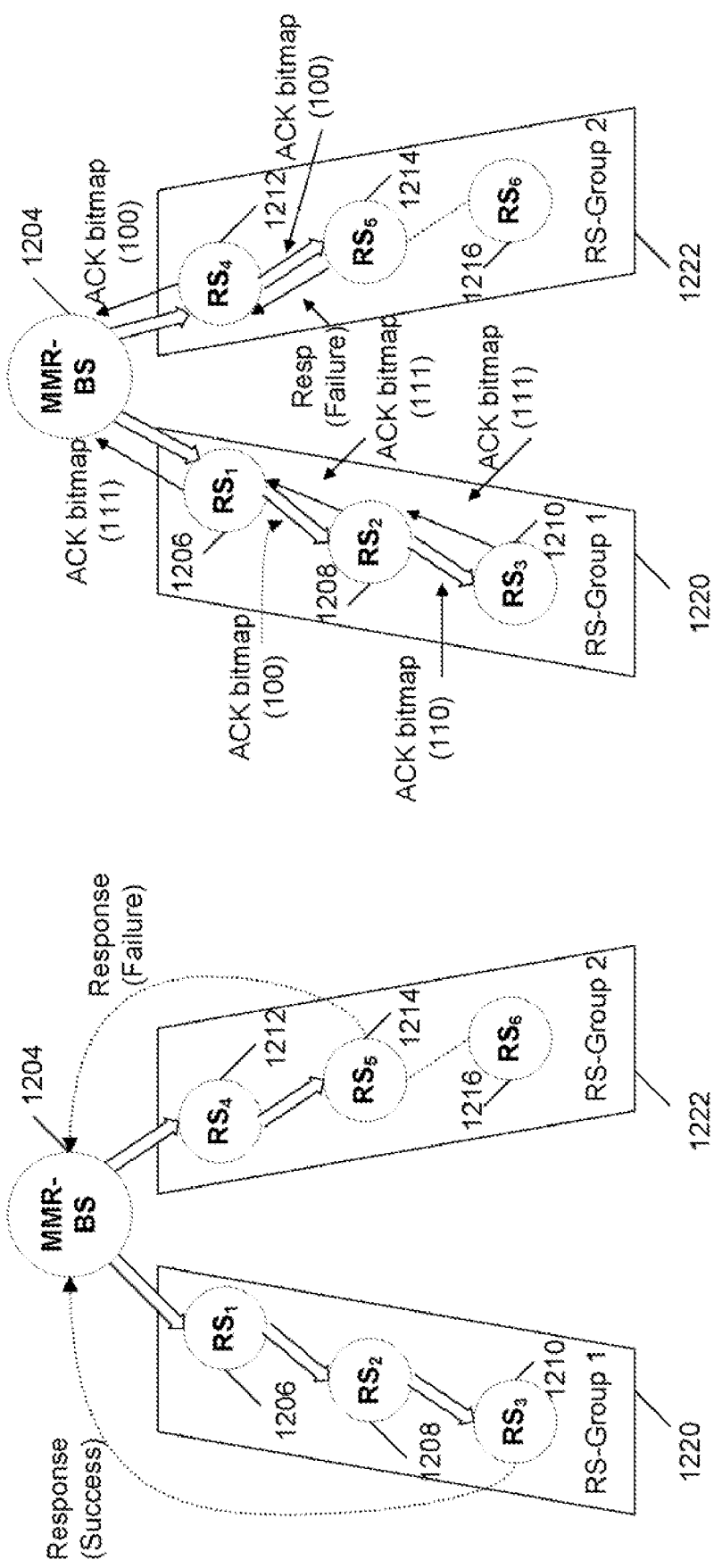
FIGS. 12a-12b are block diagrams illustrating wireless relay networks according to example embodiments.

FIGS. 12*a*-12*b* are block diagrams illustrating wireless relay networks according to example embodiments. In accordance with the example embodiments, two methods are discussed below for sending messages, for example, management messages, between an originating node, such as a base station MMR-BS 1204, to a group of relay stations, for example a RS-Group1 1220 including $RS_1$ 1206, $RS_2$ 1208, and $RS_3$ 1210 or a RS-Group2 1222 including $RS_4$ 1212, $RS_5$ 1214, and $RS_6$ 1216. In both methods, the message may be sent via a unicast transmission to the next node in a communication path based on connection or path information included in the message. For example, a communication path may include an ordered list including MS-BS 1204, $RS_1$ 1206, $RS_2$ 1208, and the node endpoint $RS_3$ 1210 of the communication path between MS-BS 1204 and $RS_3$ 1210, or the communication path may include, for example, an ordered list including MS-BS 1204, $RS_4$ 1212, $RS_5$ 1214, and the node endpoint $RS_6$ 1216 of the communication path between MS-BS 1204 and $RS_6$ 1216. If the next node in the communication path processes the message successfully, the next node may then send the message to the subsequent node as indicated in the path information. This process may continue until all the nodes in the path information receive the message successfully.

In one example embodiment, if the message is not processed successfully, a failure response may be sent directly to the originating node from a node that has failed to process the message successfully. For example, as shown in FIG. 12*a*, a failure response may be sent directly to MMR-BS 1204 from $RS_5$ 1214 if the message is not processed successfully at $RS_5$ 1214.

In another example embodiment, as shown in FIG. 12*b*, a response to the message is sent hop by hop back to the originating node. Each node in the communication path sets a bit corresponding to the node's position in a bitmap for success, and any node that fails to successfully process the message resets the bit corresponding to its position. For example, as shown in FIG. 12*b*, $RS_1$ 1206 sets a bit in the bitmap corresponding to $RS_1$ 1206 to 1 indicating success, $RS_2$ 1208 sets a bit in the bitmap corresponding to $RS_2$ 1208 to 1 indicating success, and $RS_3$ 1210 sets a bit in the bitmap corresponding to $RS_3$ 1210 to 1 indicating a success status in the processing of the message at each corresponding RS.

Additionally, a timer may be maintained by one or more nodes that may receive a failure response. According to an example embodiment, the last node, or the path endpoint node, in the communication path, or chain, may send the success response. For example, as shown in FIG. 12a, the success response may be sent by the endpoint node $RS_3$ 1210 indicating a success status of processing the message at each of the RSs included in the RS-Group1 1220. According to another example embodiment, each intermediate node may send the success response. For example, as shown in FIG. 12b, the success response may be sent by each intermediate node indicating a success status of processing the message at each of the RSs included in the RS-Group1 1220.

As shown in FIG. 12a, according to an example embodiment, a hop-by-hop unicast with end-to-end response scheme may be used, wherein the MAC management message (MAC-Mng-Msg) may be unicast from one RS to another RS in the RS-Group following the assigned path and processed by each RS on the path. Upon receiving the MAC-Mng-Msg, each RS replies with a response directly targeting the MMR-BS.

When a MMR-BS sends a MAC-Mng-Msg to a RS-Group, the MMR-BS may generate the MAC-Mng-Msg, which may include the message information, a Path-Id and an optional Path-Info TLV. The Path-Id TLV includes the ID of the path to which all the RSs in the RS-Group belong. The Path-Info TLV may include an ordered list of RSs on the path identified by the Path-Id and may be present, for example, if the MAC-Mng-Msg is a Path-ADV-REQ message having an Action-Type field set to ESTABLISH. The MMR-BS may then send the unicast message to the first RS on the path (e.g., $RS_1$ 1206 or $RS_4$ 1212). The MAC-Mng-Msg may be protected by the security association (SA) established between the MMR-BS 1204 and the first RS on the path (e.g., $RS_1$ 1206 or $RS_4$ 1212).

When a RS receives a MAC management message (MAC-Mng-Msg) from its uplink neighbor, the RS may first process the message. If the processing fails, the RS may immediately send a response with a Failure confirmation code back to the originating MMR-BS, for example, MMR-BS 1204, and may then abort the process.

If the processing succeeds, the RS may obtain the path identifier included in the Path-Id TLV. The RS may then retrieve the path information based on the path id and may determine the next RS to which it may further transmit the MAC-Mng-Msg. According to an example embodiment, if the MAC-Mng-Msg includes a Path-ADV-REQ message with an Action-Type field set to ESTABLISH, the path information may be obtained from the Path-Info TLV; otherwise, it may be retrieved based on the path-id using a record obtained by the RS from a previous operation. The RS may also send a response with a Success confirmation code back to the originating MMR-BS. If the RS (e.g., $RS_2$ 1208) has a downlink neighbor on the path (e.g., $RS_3$ 1210), the RS may regenerate the MAC-Mng-Msg using the same information it received from its uplink neighbor on the path and may unicast the message to its downlink neighbor on the path. The new MAC-Mng-Msg may be protected by the security association (SA) established between the RS and its downlink neighbor on the path.

According to an example embodiment, the MMR-BS may maintain timers (e.g., MAC-Mng-Msg-RES-Timers) for the response from each RS on the path. The value of MAC-Mng-Msg-RES-Timer for each RS may vary and may depend, for example, on transmission and/or processing latency between the MMR-BS and the RS. Such latency may be estimated, for example, based on the number of hops between the MMR-BS and the RS.

If the MMR-BS receives a response from a RS within the corresponding MAC-Mng-Msg-RES-Timer but with a Failure confirmation code, or if the MMR-BS does not receive a response from the RS within the corresponding MAC-Mng-Msg-RES-Timer, the MMR-BS may determine that the RS has not received the MAC-Mng-Msg and may determine that the chained operation has failed due to error processing or link loss. The MMR-BS may reissue the MAC-Mng-Msg and send it directly to the first RS for which failure was determined. The message may be protected by the SA established between the MMR-BS and the failure RS. The message may be processed as discussed above.

The example hop-by-hop unicast scheme discussed above may reduce bandwidth overhead especially when the relay path includes a large number of RSs. The example scheme may also reduce the processing complexity on each RS on the path, for example, by not maintaining an acknowledgement status and by sending the response directly back to the originating MMR-BS. Therefore, the example scheme discussed above may be suitable for a scenario wherein a large number of high-capability RSs may be present on a single relay path.

According to another example embodiment, as shown in FIG. 12b, a hop-by-hop unicast with hop-by-hop response scheme, may include sending a unicast MAC-Mng-Msg from one RS to another RS in an RS-Group following the assigned path of the RS-Group and processing the MAC-Mng-Msg by each RS on the path.

According to an example embodiment, in preparation for a MMR-BS (e.g., MMR-BS 1204) to send a MAC-Mng-Msg to a RS-Group (e.g., RS-Group1 1220 or RS-Group2 1222), the MMR-BS may generate the MAC-Mng-Msg, which may include message information as well as an Ack-Bitmap TLV, a Path-Id and an optional Path-Info TLV. The Path-Id TLV may, for example, include an ID of a path to which all the RSs in the RS-Group belong. According to an example embodiment, if the MAC-Mng-Msg is a Path-ADV-REQ message with an Action-Type field set to ESTABLISH, the Path-Info TLV may include an ordered list of RSs on the path identified by the Path-Id. The Ack-Bitmap TLV may include a bitmap, wherein each bit in the bitmap may indicate a processing status (e.g., Failure or Success) of the received MAC-Mng-Msg by the associated RS, and may correspond to each RS in the ordered list in the Path-Info TLV. The MMR-BS may then send the unicast message to the first RS on the path (e.g., RS1). The MAC-Mng-Msg may be protected by the SA established between MMR-BS and the first RS on the path.

According to an example embodiment, when a RS receives a MAC-Mng-Msg from its uplink neighbor, the RS may attempt to process the message. For example, when $RS_2$ 1208 receives a MAC-Mng-Msg from its uplink neighbor $RS_1$ 1206, $RS_2$ 1208 may attempt to process the message. If the processing fails, the RS may immediately send a response with a Failure confirmation code back to the uplink neighbor of the RS and may then abort the process.

If the processing succeeds, the RS may then obtain the path id included in the Path-Id TLV, and may retrieve the path information based on the path id. The RS may then determine the next RS to which the MAC-Mng-Msg may be sent. For example, $RS_2$ 1208 may determine that the MAC-Mng-Msg may be sent to $RS_3$ 1210. According to an example embodiment, if the MAC-Mng-Msg is a Path-ADV-REQ message with the Action-Type field set to ESTABLISH, the path information may be obtained from the Path-Info TLV carried in the MAC-Mng-Msg; otherwise, it may be retrieved based on the path-id using a record obtained by the RS from a previous operation. The RS may also update the Ack-Bitmap received from its uplink neighbor by setting the corresponding bit in the Ack-Bitmap to a value of 1. The RS may maintain a local record of the updated Ack-Bitmap and may include a copy of the updated Ack-Bitmap in the MAC-Mng-Msg.

According to an example embodiment, if the RS (e.g., $RS_2$ 1208) has a downlink neighbor on the path, the RS may regenerate the MAC-Mng-Msg using the same information the RS received from its uplink neighbor on the path, together with the updated Ack-Bitmap. The RS may then unicast the MAC-Mng-Msg to its downlink neighbor on the path. The new MAC-Mng-Msg may be protected by the SA established between the RS and its downlink neighbor on the path.

If the RS (e.g., $RS_3$ 1210) does not have a downlink neighbor on the path (i.e., the RS is the last station on the path, or the endpoint node), the RS may send a response to its uplink neighbor on the path with a Success confirmation code together with the updated Ack-Bitmap.

According to an example embodiment, the MMR-BS and each RS that sends a MAC-Mng-Msg to its downlink neighbor may maintain a timer (e.g., a MAC-Mng-Msg-RES-Timer) for the response. The value of the MAC-Mng-Msg-RES-Timer may depend, for example, on transmission and processing latency between the transmission station (i.e, MMR-BS or an intermediate RS) and the last RS on the path (i.e., the endpoint node). The latency may be estimated, for example, based on the number of hops between the transmission station and the last RS on the path.

According to an example embodiment, if an intermediate RS has not received a response from its downlink neighbor within its MAC-Mng-Msg-RES-Timer, it may send a response to its uplink neighbor with a Failure confirmation code together with the stored Ack-Bitmap. According to an example embodiment, any response received after the MAC-Mng-Msg-RES-Timer expires may be simply dropped by the RS.

According to an example embodiment, if an intermediate RS receives a response from its downlink neighbor within its MAC-Mng-Msg-RES-Timer, the RS may copy the confirmation code and the Ack-Bitmap TLV from the received response from its downlink neighbor to a new response and may send the new response to its uplink neighbor. The new response may be protected by the SA established between the RS and its uplink neighbor.

If the MMR-BS receives a response from its downlink neighbor within its MAC-Mng-Msg-RES-Timer, one of the following may apply: 1) if the confirmation code is Success, the MMR-BS may assume that the process has succeeded; or 2) if the confirmation code is Failure, the MMR-BS may determine which RS has failed the chained operation due to error processing or link loss by checking the Ack-Bitmap included in the response and the Path-Info. The last RS that set the ack bit may be identified as the failure RS. The MMR-BS may reissue the MAC-Mng-Msg and may directly send it to the failure RS. The message may be protected by the SA established between the MMR-BS and the failure RS. According to an example embodiment, the message may be processed as discussed above, except that the failure RS may send the response to the MAC-Mng-Msg directly to the MMR-BS other than its uplink neighbor on the path.

The example hop-by-hop unicast scheme discussed above may reduce bandwidth overhead especially when the relay path includes a large number of RSs. However, the example scheme may involve substantial processing complexity in the RS. Therefore, example hop-by-hop unicast scheme may be suitable, for example, for scenarios wherein a large number of high-capability RSs are included in a single relay path.

Figure 13:
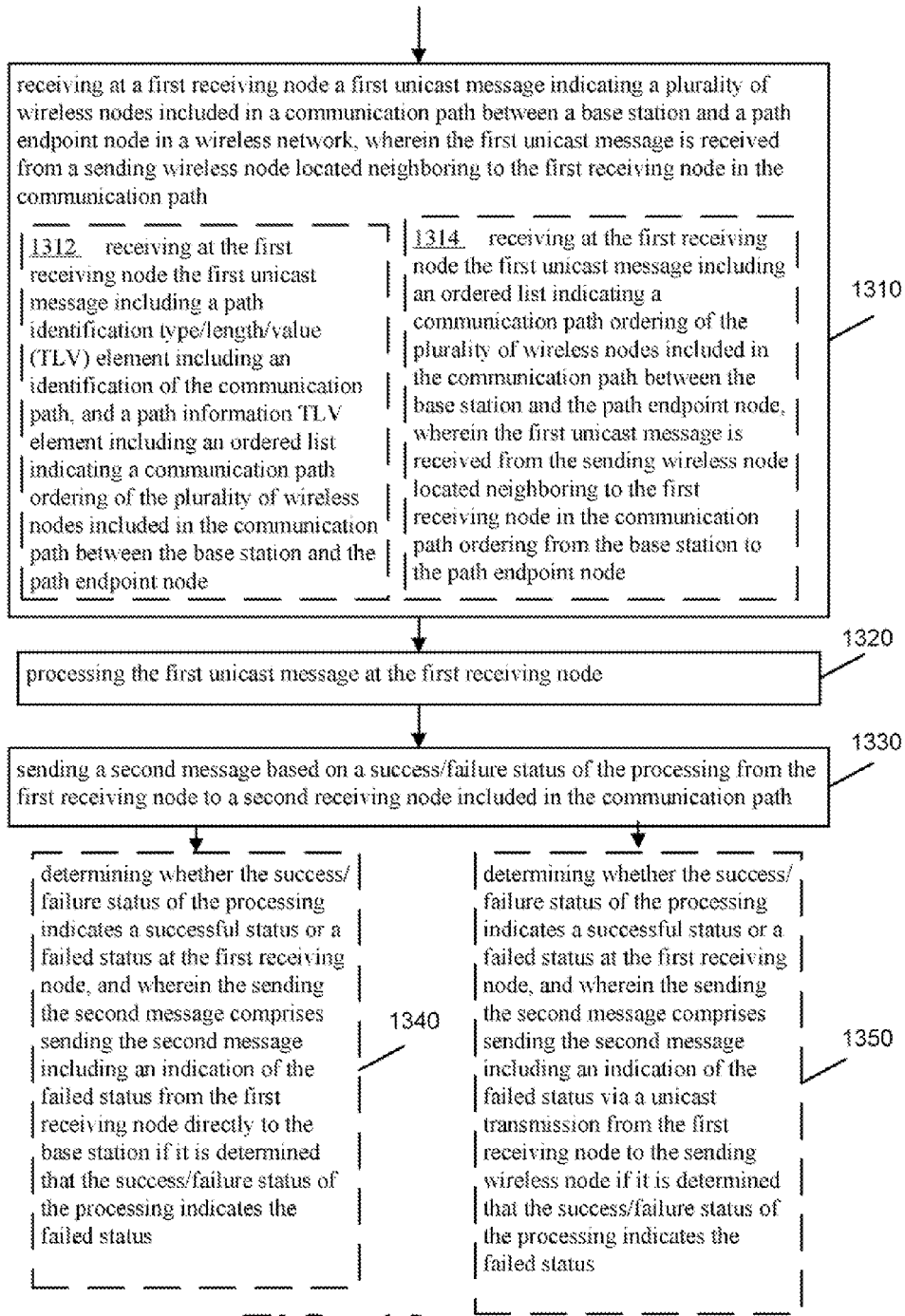
FIG. 13 is a flow chart illustrating operation of a wireless node according to an example embodiment.

FIG. 13 is a flow chart illustrating operation of a wireless node according to an example embodiment. At 1310 a first unicast message indicating a plurality of wireless nodes included in a communication path between a base station and a path endpoint node in a wireless network may be received at a first receiving node, wherein the first unicast message may be received from a sending wireless node located neighboring to the first receiving node in the communication path. For example, a first unicast message may be received from $RS_1$ 1206 at $RS_2$ 1208. For example, the first unicast message may indicate MMR-BS 1204, the $RS_1$ 1206, $RS_2$ 1208, and $RS_3$ 1210 included in a communication path between the base station MMR-BS 1204 and the path endpoint node $RS_3$ 1210.

According to an example embodiment, the first unicast message may include a path identification type/length/value (TLV) element including an identification of the communication path, and a path information TLV element including an ordered list indicating a communication path ordering of the plurality of wireless nodes included in the communication path between the base station and the path endpoint node (1312).

According to an example embodiment, the first unicast message may include an ordered list indicating a communication path ordering of the plurality of wireless nodes included in the communication path between the base station and the path endpoint node, wherein the first unicast message is received from the sending wireless node located neighboring to the first receiving node in the communication path ordering from the base station to the path endpoint node (1314). For example, the first unicast message may include the ordered list MMR-BS 1204, $RS_4$ 1212, $RS_5$ 1214, $RS_6$ 1216 indicating the communication path between the MMR-BS 1204 and the path endpoint node $RS_6$ 1216 of the RS-Group2 1222.

At 1320, the first unicast message may be processed at the first receiving node. At 1330, a second message may be sent based on a success/failure status of the processing from the first receiving node to a second receiving node included in the communication path. For example, as shown in FIG. 12a, a second message may be sent from $RS_2$ 1208 to $RS_3$ 1210 if the first unicast message is processed successfully at $RS_2$ 1208. As another example, as shown in FIG. 12b, a second message may be sent from $RS_5$ 1214 to $RS_4$ 1212 if the first unicast message is not processed successfully at $RS_5$ 1214.

According to an example embodiment, it may be determined whether the success/failure status of the processing indicates a successful status or a failed status at the first receiving node, and the sending the second message may include sending the second message including an indication of the failed status from the first receiving node directly to the base station if it is determined that the success/failure status of the processing indicates the failed status (1340). For example, as shown in FIG. 12a, a second message may be sent from $RS_5$ 1214 directly to MMR-BS 1204 if it is determined that the success/failure status of the processing at $RS_5$ 1214 indicates the failed status.

According to an example embodiment, it may be determined whether the success/failure status of the processing indicates a successful status or a failed status at the first receiving node, and the sending the second message may include sending the second message including an indication of the failed status via a unicast transmission from the first receiving node to the sending wireless node if it is determined that the success/failure status of the processing indicates the failed status (1350). For example, as shown in FIG. 12b, a second message may be sent via a unicast transmission from $RS_5$ 1214 to $RS_4$ 1212 if it is determined that the success/failure status of the processing at $RS_5$ 1214 indicates the failed status.

Figure 14:
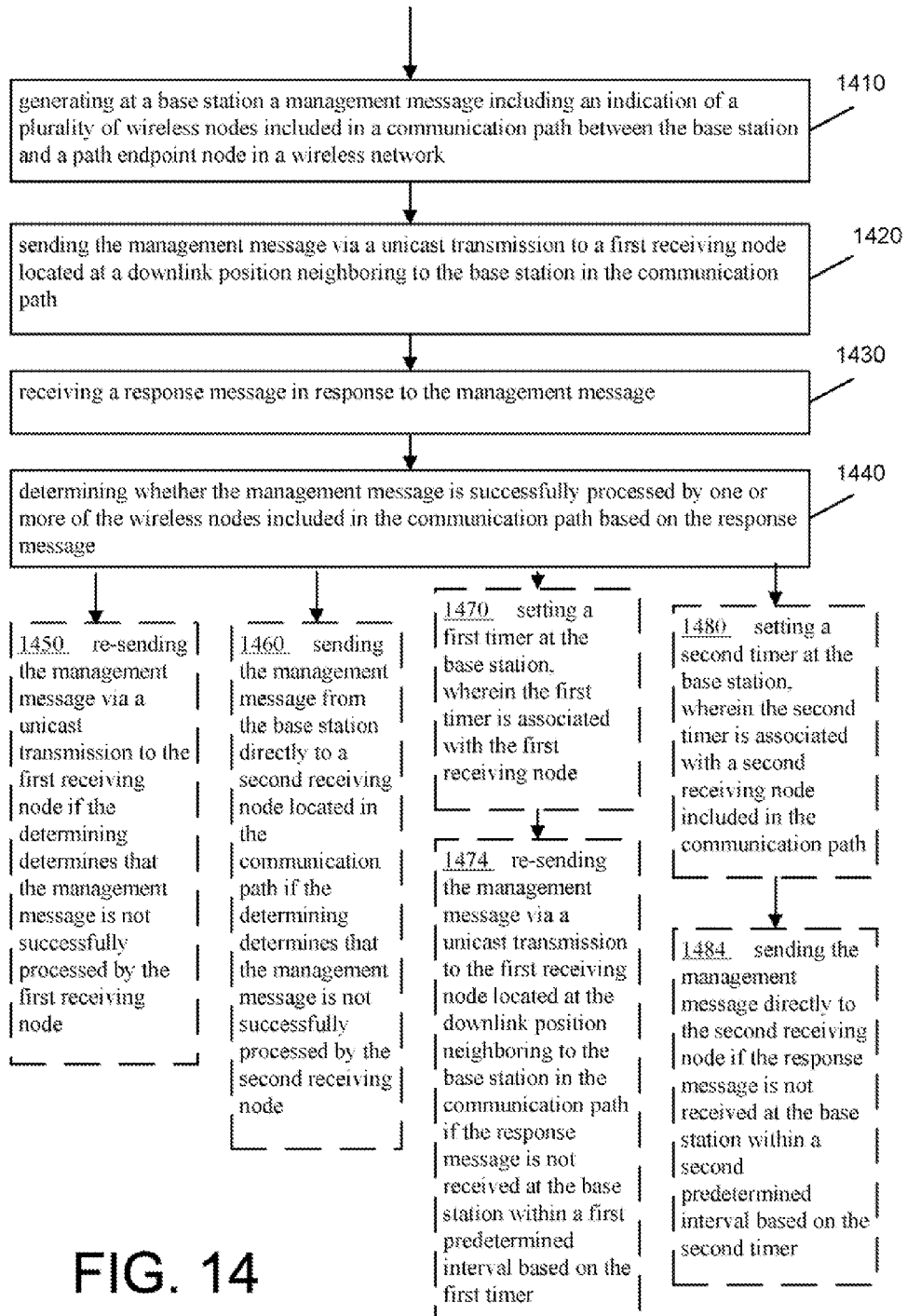
FIG. 14 is a flow chart illustrating operation of a wireless node according to an example embodiment.

FIG. 14 is a flow chart illustrating operation of a wireless node according to an example embodiment. At 1410, a management message including an indication of a plurality of wireless nodes included in a communication path between a base station and a path endpoint node in a wireless network may be generated at the base station. For example, a MAC management message including an indication of the MMR-BS 1204, the RS$_1$ 1206, RS$_2$ 1208, and RS$_3$ 1210 included in a communication path between the base station MMR-BS 1204 and the path endpoint node RS$_3$ 1210 may be generated at MMR-BS 1204.

At 1420, the management message may be sent via a unicast transmission to a first receiving node located at a downlink position neighboring to the base station in the communication path. For example, the management message may be sent unicast from MMR-BS 1204 to RS$_1$ 1206. At 1430, a response message may be received in response to the management message. For example, as shown in FIG. 12*a*, a response message may be received at MMR-BS 1204 from RS$_3$ 1210.

At 1440, it may be determined whether the management message is successfully processed by one or more of the wireless nodes included in the communication path based on the response message. For example, as shown in FIG. 12*b*, MMR-BS 1204 may receive a response message from RS$_1$ 1206 and may determine that the management has been successfully processed by RS$_1$ 1206, RS$_2$ 1208, and RS$_3$ 1210 based on the ACK bitmap that indicates a value of "111" indicating that all three RSs in the communication path of RS-Group1 1220 successfully processed the management message.

According to an example embodiment, the management message may be re-sent via a unicast transmission to the first receiving node if the determining determines that the management message is not successfully processed by the first receiving node (1450).

According to an example embodiment, the management message may be sent from the base station directly to a second receiving node located in the communication path if the determining determines that the management message is not successfully processed by the second receiving node (1460). For example, MMR-BS 1204 may send the management message directly to RS$_5$ 1214, for example, if the response message indicates that RS$_5$ 1214 did not successfully process the management message.

According to an example embodiment, a first timer may be set at the base station, wherein the first timer is associated with the first receiving node (1470). For example, a first timer associated with RS$_4$ 1212 may be set at MMR-BS 1204. The management message may be re-sent via a unicast transmission to the first receiving node located at the downlink position neighboring to the base station in the communication path if the response message is not received at the base station within a first predetermined interval based on the first timer (1474). For example, the management message may be re-sent via a unicast transmission to RS$_4$ 1212 if the response message is not received at MMR-BS 1204 within a first predetermined interval based on the first timer.

According to an example embodiment, a second timer may be set at the base station, wherein the second timer is associated with a second receiving node included in the communication path (1480). For example, a second timer associated with RS$_5$ 1214 may be set at MMR-BS 1204. The management message may be sent directly to the second receiving node if the response message is not received at the base station within a second predetermined interval based on the second timer (1484). For example, the management message may be sent directly to RS$_5$ 1214 if the response message is not received at MMR-BS 1204 within a second predetermined interval based on the second timer.

Figure 15:
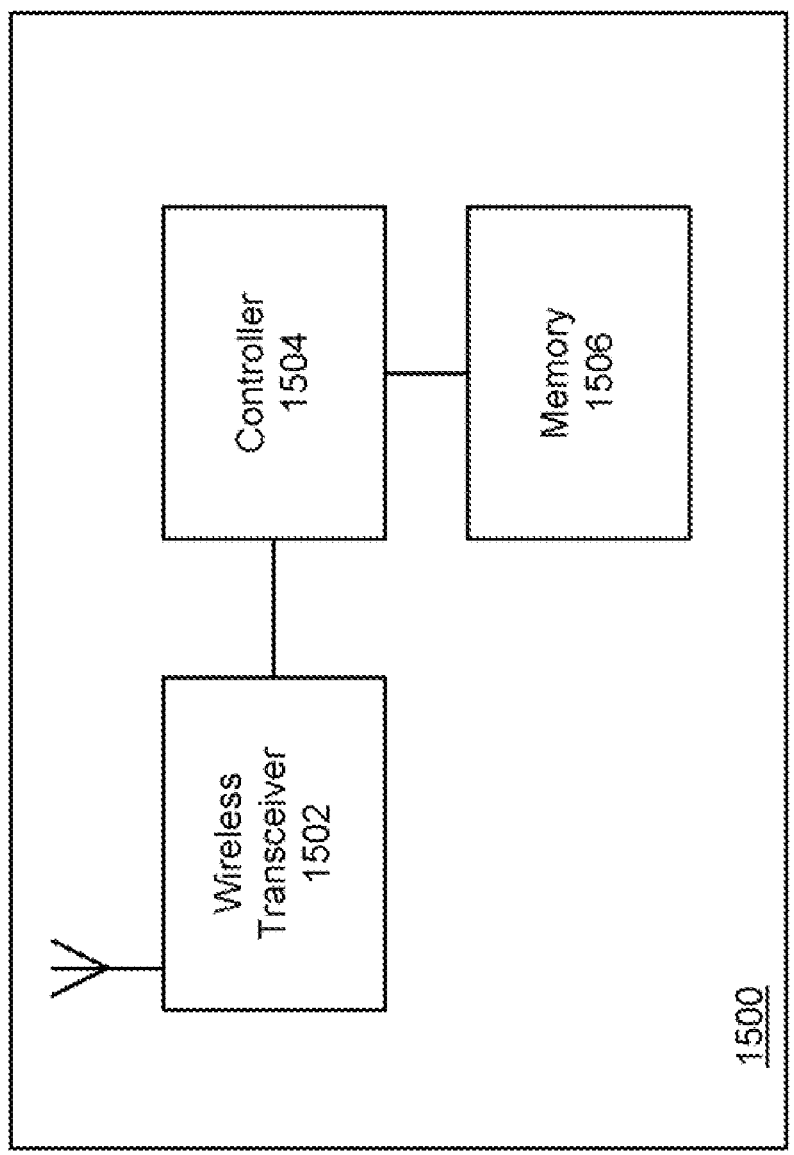
FIG. 15 is a block diagram illustrating an apparatus that may be provided in a wireless node according to an example embodiment.

FIG. 15 is a block diagram illustrating an apparatus 1500 that may be provided in a wireless node according to an example embodiment. The wireless node (e.g. station or AP) may include, for example, a wireless transceiver 1502 to transmit and receive signals, a controller 1504 to control operation of the station and execute instructions or software, and a memory 1506 to store data and/or instructions.

Controller 1504 may be programmable and capable of executing software or other instructions stored in memory or on other computer media to perform the various tasks and functions described above, such as one or more the tasks or methods described above in FIGS. 1-14.

In addition, a storage medium may be provided that includes stored instructions, when executed by a controller or processor that may result in the controller 1504, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, at a first receiving relay station, a first unicast message including an identification of a specific communication path indicating an ordering of a plurality of intermediate wireless nodes between a base station and a path endpoint node in a wireless network, wherein the first unicast message is received from a sending wireless node located neighboring to the first receiving relay station in the communication path;
   processing the first unicast message at the first receiving relay station;

sending, from the first receiving relay station to a second receiving relay station included in the communication path, a second message based on a success/failure status of the processing;

recording the communication path at the first receiving relay station; and routing subsequent traffic at the first receiving relay station based on the pre-recorded identified communication path.

2. The method of claim 1 wherein the sending wireless node comprises a sending relay station.

3. The method of claim 1 wherein the communication path indicates the ordering of the base station, the plurality of intermediate wireless nodes, and the path endpoint node.

4. The method of claim 1 wherein the first unicast message includes a Medium Access Control (MAC) management message.

5. The method of claim 1 wherein the first unicast message includes a path advertisement request message.

6. The method of claim 1 wherein receiving the first unicast message comprises:

receiving at the first receiving relay station the first unicast message including an ordered list indicating the communication path ordering of the plurality of intermediate wireless nodes included in the communication path between the base station and the path endpoint node, wherein the first unicast message is received from the sending wireless node located neighboring to the first receiving relay station in the communication path ordering from the base station to the path endpoint node.

7. The method of claim 1 and further comprising:

determining whether the success/failure status of the processing indicates a successful status or a failed status at the first receiving relay station, and wherein the sending the second message comprises sending the second message including an indication of the failed status from the first receiving relay station directly to the base station if it is determined that the success/failure status of the processing indicates the failed status.

8. The method of claim 1 and further comprising:

determining whether the success/failure status of the processing indicates a successful status or a failed status at the first receiving relay station, and wherein the sending the second message comprises sending the second message including an indication of the successful status at the first receiving relay station from the first receiving relay station directly to the base station if it is determined that the success/failure status of the processing indicates the successful status and if the first receiving relay station includes the path endpoint node.

9. The method of claim 1 and further comprising:

determining whether the success/failure status of the processing indicates a successful status or a failed status at the first receiving relay station, and wherein the sending the second message comprises sending the second message including an indication of the failed status via a unicast transmission from the first receiving relay station to the sending wireless node if it is determined that the success/failure status of the processing indicates the failed status.

10. The method of claim 1 and further comprising:

determining whether the success/failure status of the processing indicates a successful status or a failed status at the first receiving relay station, and wherein the sending the second message comprises sending the second message including an indication of the successful status at the first receiving relay station via a unicast transmission from the first receiving relay station to the sending wireless node if it is determined that the success/failure status of the processing indicates the successful status at the first receiving relay station and if the first receiving node includes the path endpoint node.

11. The method of claim 1 and further comprising:

determining whether the success/failure status of the processing indicates a successful status or a failed status at the first receiving relay station, and determining the second receiving relay station located neighboring to the first receiving relay station in the communication path ordering from the path endpoint node to the base station, and wherein the sending the second message comprises sending the second message including an indication of the successful status at the first receiving relay station via a unicast transmission from the first receiving relay station to the second receiving relay station if it is determined that the success/failure status of the processing indicates the successful status at the first receiving relay station.

12. The method of claim 1 and further comprising:

setting a value of a bit corresponding to the first receiving relay station and included in an acknowledgment (ACK) bitmap based on the success/failure status of the processing at the first receiving relay station, wherein the sending the second message comprises sending the second message including the ACK bitmap from the first receiving relay station to the second receiving relay station included in the communication path after the setting the value of the bit.

13. The method of claim 1 and further comprising:

receiving a downlink response message from a downlink wireless node located in a downlink direction from the first receiving relay station in the communication path between the base station and the endpoint node;

determining a success/failure status of processing performed at the downlink wireless node based on the downlink response massage; and sending an uplink response message indicating the success/failure status of processing performed at the wireless node via a unicast transmission to the sending wireless node.

14. The method of claim 1 and further comprising:

setting a first timer at the first receiving relay station, wherein the first timer is associated with the second receiving relay station; and sending an indication of a failed status at the second receiving relay station to the first sending relay station if a response message is not received at the first receiving relay station from the second receiving relay station within a predetermined interval based on the first timer.

15. A first relay station for wireless communications, the first relay station comprising:

a controller;

a memory coupled to the controller;

a wireless transceiver coupled to the controller;

the apparatus configured to:

receive a first unicast message including an identification of a specific communication path indicating an ordering of a plurality of intermediate wireless nodes between a base station and a path endpoint node in a wireless network, wherein the first unicast message is received from a sending wireless node located neighboring to the first relay station in the communication path;

process the first unicast message;

send, to a second relay station included in the communication path, a second message based on a success/failure status of the processing;

record the communication path; and route subsequent traffic based on the prerecorded identified communication path.

* * * * *

UNITED STATES PATENT AND TRADEMARK OFFICE
CERTIFICATE OF CORRECTION

| | | |
|---|---|---|
| PATENT NO. | : 7,889,713 B2 | Page 1 of 1 |
| APPLICATION NO. | : 11/549387 | |
| DATED | : February 15, 2011 | |
| INVENTOR(S) | : Zheng et al. | |

It is certified that error appears in the above-identified patent and that said Letters Patent is hereby corrected as shown below:

In column 28, line 39, in claim 13, delete "massage" and insert -- message --, therefor.

Signed and Sealed this
Thirty-first Day of May, 2011

David J. Kappos
*Director of the United States Patent and Trademark Office*